US008045224B2

(12) United States Patent
Arai et al.

(10) Patent No.: US 8,045,224 B2
(45) Date of Patent: Oct. 25, 2011

(54) IMAGE FORMATION SYSTEM ADDING PATTERN INFORMATION TO PRINT IMAGE BASED ON READ PATTERN INFORMATION FROM MEDIUM SURFACE FOR DETERMINING IF MEDIUM IS ORIGINAL

(75) Inventors: Yasuhiro Arai, Ebina (JP); Atsushi Ugajin, Ebina (JP); Hirokazu Tsubota, Ebina (JP); Satoshi Kurashima, Ebina (JP); Toshio Hisamura, Ebina (JP); Masaki Fujise, Ebina (JP); Yoshitake Matsubara, Ebina (JP); Osamu Yasui, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 737 days.

(21) Appl. No.: 12/133,194

(22) Filed: Jun. 4, 2008

(65) Prior Publication Data

US 2009/0116075 A1 May 7, 2009

(30) Foreign Application Priority Data

Nov. 7, 2007 (JP) ................................ 2007-289897

(51) Int. Cl.

| | |
|---|---|
| ***B41M 3/14*** | (2006.01) |
| ***G06K 9/78*** | (2006.01) |
| ***G06K 15/02*** | (2006.01) |
| ***G06K 19/06*** | (2006.01) |
| ***G07D 7/20*** | (2006.01) |
| ***G06T 7/40*** | (2006.01) |

(52) U.S. Cl. ........ 358/1.9; 358/3.28; 382/100; 382/108; 235/494; 340/5.86

(58) Field of Classification Search .................. 358/1.9, 358/3.28, 3.24, 1.14; 382/100, 108, 181; 283/73, 74, 113, 901, 902; 235/375, 487, 235/494; 356/71, 239.3, 237.2, 600; 340/5.86
See application file for complete search history.

(56) References Cited

U.S. PATENT DOCUMENTS

| | | | | |
|---|---|---|---|---|
| 7,770,803 | B2 * | 8/2010 | Onishi | 235/494 |
| 7,856,143 | B2 * | 12/2010 | Abe et al. | 382/181 |
| 7,894,102 | B2 * | 2/2011 | Noguchi | 358/3.28 |

FOREIGN PATENT DOCUMENTS

| | | | |
|---|---|---|---|
| JP | 2004-112644 | A | 4/2004 |
| JP | 2004-151833 | A | 5/2004 |
| JP | 2005-28654 | A | 2/2005 |

OTHER PUBLICATIONS

Notification of Reason for Refusal issued in counterpart Japanese Application No. 2007-289897 dated Feb. 9, 2010.

* cited by examiner

*Primary Examiner* — Scott A Rogers
(74) *Attorney, Agent, or Firm* — Sughrue Mion, PLLC

(57) ABSTRACT

An image formation system includes a medium-pattern-information-read-unit that reads pattern information of a surface of a medium; a pattern-information-image-creation-unit that creates a pattern Information image based on the read pattern information; and a print unit that adds the pattern information image to a print image to be printed on the surface of the medium and prints the print image on the medium.

11 Claims, 19 Drawing Sheets

IMAGE FORMATION SYSTEM ADDING PATTERN INFORMATION TO PRINT IMAGE BASED ON READ PATTERN INFORMATION FROM MEDIUM SURFACE FOR DETERMINING IF MEDIUM IS ORIGINAL

CROSS-REFERENCE TO RELATED APPLICATIONS

This application is based on and claims priority under 35 USC 119 from Japanese Patent Application No. 2007-289897 filed on Nov. 7, 2007.

BACKGROUND

Technical Field

This invention relates to an image formation system, an image formation apparatus, a process for image formation, a computer readable medium for image formation and a pattern-information-collating-apparatus.

SUMMARY

According to an aspect of the invention, there is provided an image formation system including: a medium-pattern-information-read-unit that reads pattern information of a surface of a medium; a pattern-information-image-creation-unit that creates a pattern information image based on the read pattern information; and a print unit that adds the pattern information image to a print image to be printed on the surface of the medium and prints the print image on the medium.

BRIEF DESCRIPTION OF THE DRAWINGS

Exemplary embodiment(s) of the present invention will be described in detail based on the following figures, wherein:

FIG. 5A is a schematic representation of a received print image; FIG. 5B is a schematic representation of a pattern-information-read-area; and FIG. 5C is a schematic representation of a print image to which medium-pattern-information-determination-information is added;

FIG. 6A is a schematic representation when binding hole making setting is made; FIG. 6B is a schematic representation when saddle stitching setting is made; FIG. 6C is a schematic representation when corner binding setting is made; and FIG. 6D is a schematic representation when edge binding setting is made;

FIG. 17A is a schematic representation of a medium-pattern-information-read-area; FIG. 17B is a schematic representation of a print image; and FIG. 17C is a schematic representation of a print-image-with-medium-pattern-information-determination-information;

FIG. 19A is a schematic representation of a medium-pattern-information-read-area; FIG. 19B is a schematic representation of a print image; and FIG. 19C is a schematic representation of a print-image-with-medium-pattern-information-determination-information.

DETAILED DESCRIPTION

Figure 1:
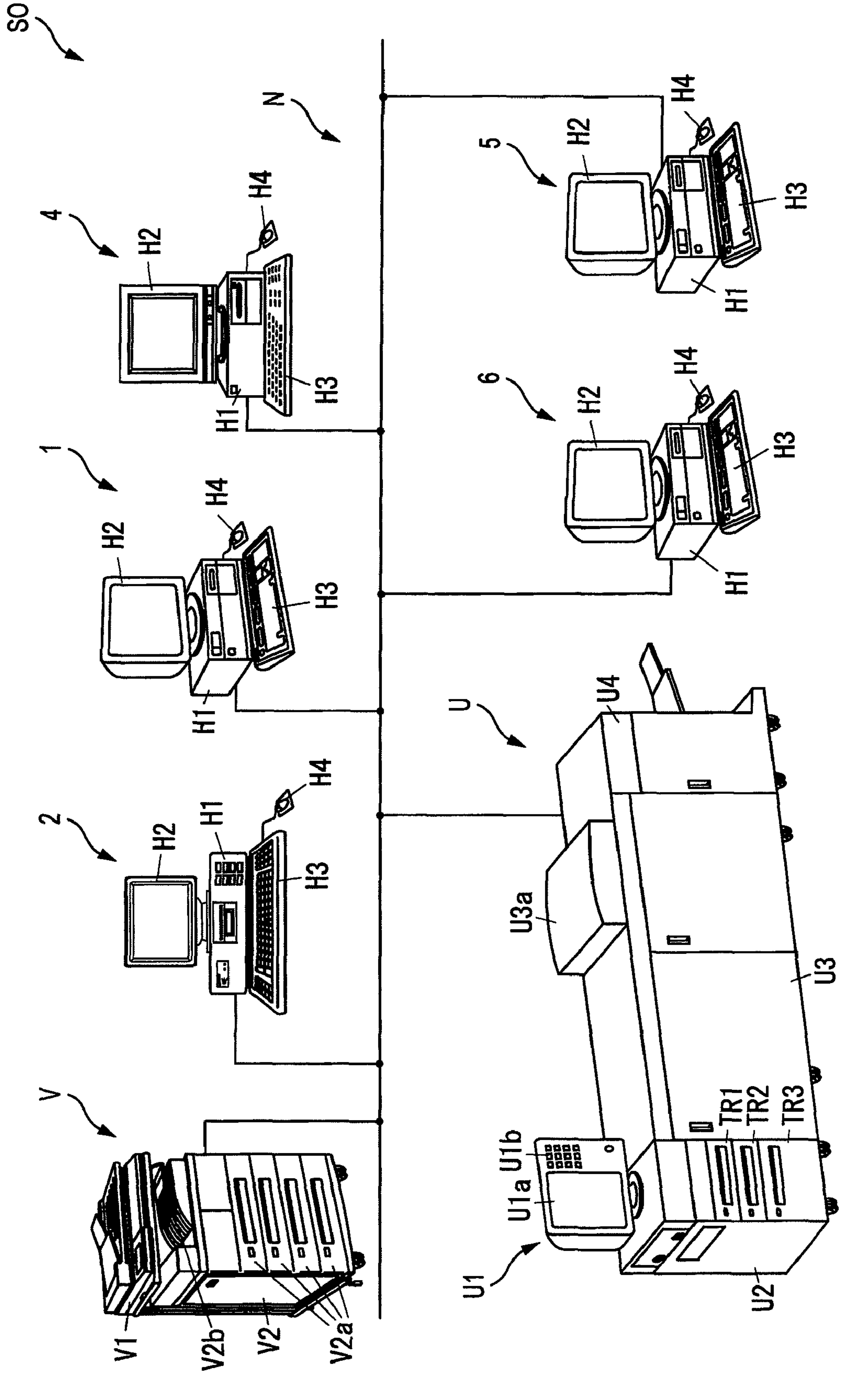
FIG. 1 is a general schematic representation of an image formation system of a first exemplary embodiment of the invention.

Referring now to the accompanying drawings, there are shown exemplary embodiments of the invention. However, the invention is not limited to the following exemplary embodiments.

For easy understanding of the description to follow, in the accompanying drawings, back and forth direction is X axis direction, side to side direction is Y axis direction, and up and down direction is Z axis direction, and directions or sides indicated by arrows X, −X, Y, −Y, Z, and −Z are forward, backward, rightward, leftward, upward, and downward or front, rear (back), right, left, upper side (top), and lower side (bottom).

In the accompanying drawings, a mark including a dot described in a circle means an arrow from the back of the plane of the drawing to the surface and a mark including X described in a circle means an arrow from the surface of the plane of the drawing to the back.

In the description that follows using the accompanying drawings, components and members other than those required for the description are not shown in the drawings where appropriate for easy understanding of the description.

First Exemplary Embodiment

FIG. 1 is a general schematic representation of an image formation system of a first exemplary embodiment of the invention.

In FIG. 1, an image formation system S0 of the first exemplary embodiment of the invention has an information communication line network N. Connected to this information communication line network N are an image information transmission terminal 1 for transmitting image information to print by the user, a management apparatus 2 for managing information transmitted and received on the information communication line network N, other terminals 4, 5, and 6, a first image formation apparatus U for printing based on the image information transmitted from each of the terminals 1, 4, 5, and 6, and a second image formation apparatus V for printing based on the image information transmitted from each of the terminals 1, 4, 5, and 6, the second image formation apparatus V also as an example of a pattern-information-collating-apparatus capable of reading media; they can transmit and receive information to and from each other.

The pattern information in the exemplary embodiments may be information regarding random patterns unique to each medium originating in asperities of the medium surface, or may be information regarding random patterns unique to each medium originating in tangles of fibrous materials, such as paper fingerprint. The medium may be a plastic medium such as OHP, or may be a medium made of another material.

Each of the terminals 1, 4, 5, and 6 and the management apparatus 2 is implemented as a computer as an example of an information processing apparatus, and is made up of an apparatus main body H1, a display H2, a keyboard H3 and a mouse H4 as an example of an input unit, a hard disk drive as an example of information storage (not shown), and the like. Programs (software) for controlling the basic operation of the computer are built in each of the terminals 1, 4, 5, and 6. As the software, for example, basic software (operating system), application programs of word processing software for document preparation, drawing software, software for transmitting and receiving electronic mail, etc., a driver as an example of software for controlling each of the image formation apparatus U and V, and the like are installed.

(Description of First Image Formation Apparatus)

Figure 2:
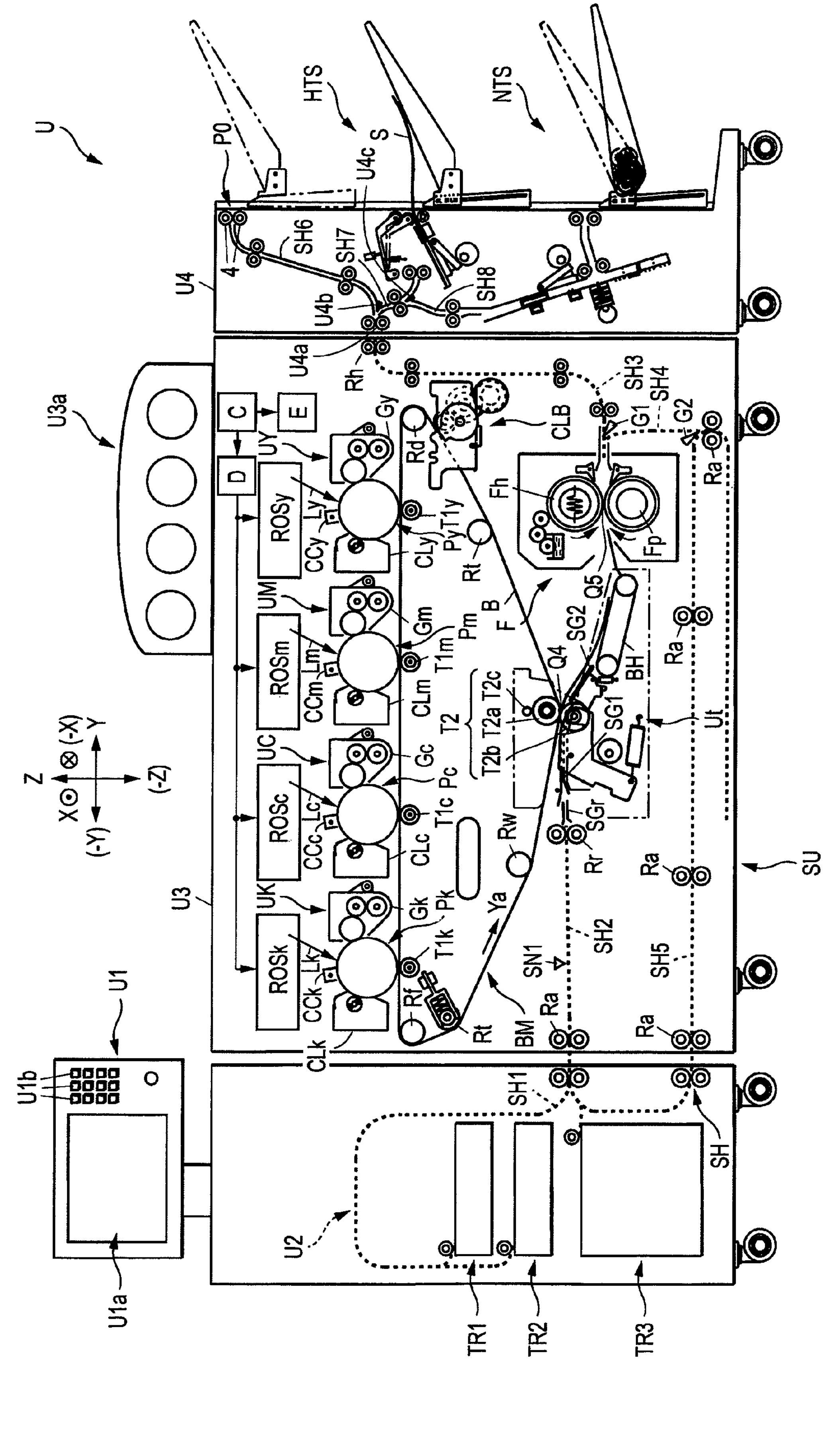
FIG. 2 is a general schematic representation of an image formation apparatus of the first exemplary embodiment of the invention.

FIG. 2 is a general schematic representation of the image formation apparatus of the first exemplary embodiment of the invention.

In FIG. 2, the first image formation apparatus U is implemented as a large-scaled printer U and has an operation section U1 for operating the printer U, a sheet feed unit U2, an image formation apparatus main body U3, and a sheet treatment unit U4.

The operation section U1 has a display section U1*a* for displaying information and input buttons U1*b* for making various settings of the image formation apparatus.

The sheet feed unit U2 has a plurality of sheet feed vessels TR1 to TR3, a sheet feed passage SH1 for taking out a record sheet S as an example of media stored in the sheet feed vessels TR1 to TR3 and conveying the record sheet S to the image formation apparatus main body U3, and the like.

In FIG. 2, the image formation apparatus main body U3 has a control section C for controlling the printer U, an information transmitting and receiving unit (not shown) for receiving image information transmitted from the terminals 1, 4, 5, and 6 connected through the information communication line network N, a latent-image-formation-unit-drive-circuit D and a power supply circuit E controlled by the control section C, and the like. The latent-image-formation-unit-drive-circuit D whose operation is controlled by the control section C creates color image information of yellow, magenta, cyan, and black based on the image information transmitted from the terminals 1, 4, 5, and 6 and outputs drive signals responsive to the color image information to latent-image-formation-units ROSy, ROSm, ROSc, and ROSk of visible-image-formation-units UY, UM, UC, and UK of the colors at predetermined timings. The visible-image-formation-units UY, UM, UC, and UK of the colors are supported movably between a draw position where the visible-image-formation-unit is drawn out ahead of the image formation apparatus main body U3 and a placement position where the visible-image-formation-unit is placed in the image formation apparatus main body U3.

In the black visible-image-formation-unit UK, an image supporter Pk is surrounded by a charger CCk, a developing device Gk, an image supporter cleaner CLk, etc.

Image supporters Py, Pm, and PC of other visible-image-formation-units UY, UM, and UC are also surrounded by chargers CCy, CCm, and CCc, developing devices Gy, Gm, and Gc, image supporter cleaners CLy, CLm, and CLc, etc., like those surrounding the image supporter Pk.

In FIG. 2, the image supporter Py, Pm, Pc, Pk is charged uniformly by the charger CCy, CCm, CCc, CCk and then has an electrostatic latent image formed on a surface according to latent image write light Ly, Lm, Lc, Lk output by the latent image formation unit ROSy, ROSm, ROSc, ROSk. The electrostatic latent image on the surface of the image supporter Py, Pm, Pc, Pk is developed into a yellow visible image (toner image), a magenta visible image (toner image), a cyan visible image (toner image), a black visible image (toner image) by the developing device Gy, Gm, Gc, Gk. When the developer in the developing device Gy, Gm, Gc, Gk is consumed because of the developing, the developing device is replenished with a developer from a developer replenishment unit U3*a* placed on the top of the image formation apparatus main body U3. Developer replenishment vessels (not shown) or toner cartridges are supported detachably and replaceably in the developer replenishment unit U3*a*.

The visible images on the surfaces of the image supporters Py, Pm, Pc, and Pk are transferred in order onto an intermediate transfer belt B as an example of an intermediate transfer body in an overlap manner by primary transfer members T1*y*, T1*m*, T1*c*, and T1*k* as an example of primary transfer devices and a multicolor image is formed on the intermediate transfer belt B. The multicolor image formed on the intermediate transfer belt B is conveyed to a secondary transfer area Q4.

To form only a single-color image, only the black (K) image supporter Pk and the black (K) developing device Gk are used and only a black visible image is formed.

After the primary transfer, the residues on the surfaces of the image supporters Py, Pm, Pc, and Pk are removed and cleaned by the image supporter cleaners CLy, CLm, CLc, and CLk.

The intermediate transfer belt B is supported for rotation in an arrow Ya direction by an intermediate transfer body drive member Rd, a tension generation member Rt, a meandering prevention member Rw, a plurality of driven members Rf, a secondary transfer opposed member T2*a*, and the primary transfer members T1*y*, T1*m*, T1*c*, and T1*k*. In the first exemplary embodiment, the members Rd, Rt, Rw, Rf, T2*a*, T1*y*, T1*m*, T1*c*, and T1*k* are each formed of a roll-like member.

A secondary transfer unit Ut is placed below the backup roll T2*a* as an example of the secondary transfer opposed member. A secondary transfer member T2*b* of the secondary transfer unit Ut is placed so that it can be brought into and out of contact with the backup roll T2*a* with the intermediate transfer belt B between, and the area where the secondary transfer member T2*b* is pressed against the intermediate transfer belt B forms a secondary transfer area Q4. In the first exemplary embodiment, a contact conducting member T2*c* is abutted against the backup roll T2*a* and a secondary transfer voltage of the same polarity as the charge polarity of the developer is applied to the contact feeding member T2*c* at a predetermined timing from the power supply circuit E controlled by the control section C.

The secondary transfer opposed member T2*a*, the secondary transfer member T2*b*, and the contact feeding member T2*c* make up a secondary transfer device T2 of the first exemplary embodiment, and the primary transfer members T1*y*, T1*m*, T1*c*, and T1*k*, the intermediate transfer belt B, and the secondary transfer device T2 make up a transfer unit of the first exemplary embodiment.

A sheet conveying passage SH2 is placed below the intermediate transfer belt B. A record sheet S fed from the sheet feed passage SH1 of the sheet feed unit U2 is conveyed to a registration roll Rr as an example of a sheet feed timing adjustment member of the conveying passage SH2. A medium-pattern-information-reader SN1 is placed in the conveying passage SH2 for reading pattern information of the surface of the record sheet S or so-called paper fingerprint when the record sheet S passes through. The medium-pattern-information-reader SN1 of the first exemplary embodiment is placed so as to cover the maximum sheet width of the passing record sheet S and can read the paper fingerprint in the whole area of the maximum sheet width.

The record sheet S conveyed to the registration roll Rr is conveyed through a before-transfer upstream medium guide member SGr and a before-transfer downstream medium guide member SG1 to the secondary transfer area Q4 at the timing at which a multicolor image is conveyed to the secondary transfer area Q4.

When the multicolor image on the intermediate transfer belt B is conveyed to the secondary transfer area Q4 passes through the secondary transfer area Q4, the multicolor image is transferred to the record sheet S by the secondary transfer device T2. For the multicolor image, the toner images primarily transferred to the surface of the intermediate transfer belt B in an overlap manner are secondarily transferred to the record sheet S collectively.

After the secondary transfer, the intermediate transfer belt B is cleaned by an intermediate transfer body cleaner CLB. The secondary transfer member T2*b* and the intermediate transfer body cleaner CLB are disposed so that they can be brought into and out of contact with the intermediate transfer belt B. To form a multicolor image, they are placed out of contact with the intermediate transfer belt B until an unfixed visible image of the final color is primarily transferred to the intermediate transfer belt B.

The record sheet S to which an unfixed visible image is secondarily transferred is conveyed through an after-transfer medium guide member SG2 and a medium conveying member BH to a fixing unit F. This fixing unit F has a heating roll Fh as an example of a heating fixing member and a pressurization roll Fp as an example of a pressurization fixing member, and the record sheet S is conveyed to a fixing area Q5 where a pair of fixing members Fh and Fp come in contact with each other in a state in which a pressure acts. When the unfixed visible image on the record sheet S passes through the fixing area Q5, it is heated and fixed by the fixing unit F. A switching member G1 is provided downstream from the fixing unit F. The switching member G1 selectively switches the record sheet S conveyed on the conveying passage SH2 and heated and fixed in the fixing area Q5 to either a discharge passage SH3 or an inversion passage SH4. The record sheet S conveyed to the discharge passage SH3 is discharged from a discharge roller Rh as an example of a discharge member to the post-treatment unit U4.

A circulating passage SH5 is connected to the inversion passage SH4 and a conveying direction regulation member G2 is provided in the connection part. The conveying direction regulation member G2 allows the record sheet S conveyed to the inversion passage SH4 to once pass through as it is, and conveys the passing record sheet S in an opposite direction and conveys the record sheet S to the circulating passage SH5. The record sheet S conveyed to the circulating passage SH5 is again sent to the secondary transfer area Q4 through the sheet feed passage SH1.

The components SH1 to SH5 make up a medium conveying passage SH. The components SH, Ra, Rr, Rh, SG1, SG2, SGr, BH, G1, and G2 make up a medium conveying unit SU.

(Post-treatment Unit U4)

In FIG. 2, the post-treatment unit U4 is provided with a medium carrying-in slot U4*a* for carrying in the record sheet S with an image recorded thereon in the image formation apparatus main body U3 on the face connected to the image formation apparatus main body U3. The record sheet S carried in through the medium carrying in slot U4*a* is conveyed to either an upper end discharge passage SH6 extending to the upper right or a first post-treatment conveying passage SH7 extending downward by switching of a first switching member U4*b*. A second post-treatment conveying passage SH8 is connected to the first post-treatment conveying passage SH7 and the record sheet S is conveyed to either the first post-treatment conveying passage SH7 or the second post-treatment conveying passage SH8 by a second switching member U4*c* placed in the connection part of the post-treatment conveying passages.

The record sheet S conveyed to the upper end discharge passage SH6 is discharged from an upper end discharge port P0 by an upper end discharge member 4 without being subjected to post-treatment.

An edge binding unit HTS is placed downstream of the first post-treatment conveying passage SH7. The edge binding unit HTS executes edge binding treatment of stacking and aligning a plurality of record sheets S, making binding holes in the edge of the record sheet bundle, hammering staples into the record sheet bundle to bind the record sheet bundle or aligning the record sheet bundle without binding, and discharging the record sheet bundle.

A saddle stitching unit NTS is placed downstream of the second post-treatment conveying passage SH8. The saddle stitching unit NTS executes saddle stitching treatment of stacking and aligning a plurality of record sheets S and binding the center of the record sheet bundle with staples and then folding the record sheet bundle double and discharging the record sheet bundle or folding the record sheet bundle double and discharging the record sheet bundle without binding.

The edge binding unit HTS and the saddle stitching unit NTS are already known and are described, for example, in JP-A-2003-089462, JP-A-2003-089463, etc., and therefore will not be discussed here in detail.

(Second Image Formation Apparatus)

In FIG. 1, the second image formation apparatus V of the first exemplary embodiment is implemented as a copier V, which has a scanner section V1 as an example of an image reader of the upper part and a printer section V2 as an example of an image recorder of the lower part. The printer section V2 has a plurality of sheet feed vessels V2*a* for storing media S and a sheet discharge vessel V2*b* into which printed media S are discharged. Therefore, the copier V of the first exemplary embodiment is implemented as a multifunction device having the functions of a printer, a facsimile, a network scanner, and a copier in one and the basic configuration of the copier V is similar to that of an already known electrophotographic multifunction device (for example, refer to JP-A-2004-287297); various image formation apparatus can be adopted.

(Description of Control Section of First Exemplary Embodiment)

Next, function units in the image formation system S0 of the first exemplary embodiment will be discussed. In the first exemplary embodiment, from the terminals 1 and 4 to 6, image information is only transmitted through the driver in response to input of print execution and a detailed description is omitted because of already known art.

(Description of Control Section of Printer U)

Figure 3:
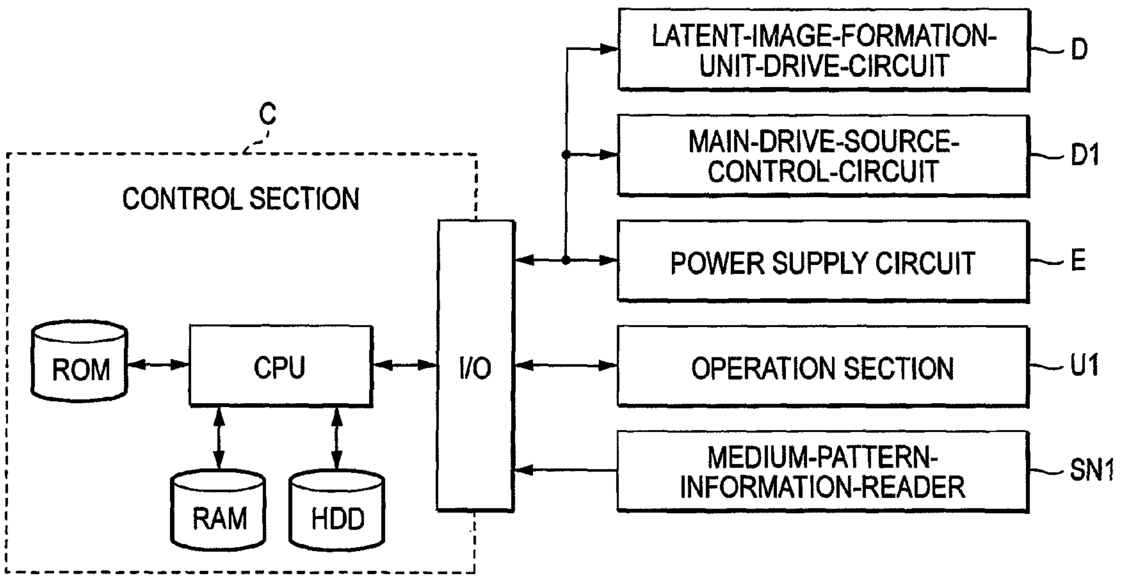
FIG. 3 is a schematic representation of the main part of a control section of the first image formation apparatus in the image formation system of the first exemplary embodiment of the invention.

FIG. 3 is a schematic representation of the main part of the control section of the first image formation apparatus in the image formation system of the first exemplary embodiment of the invention.

Figure 4:
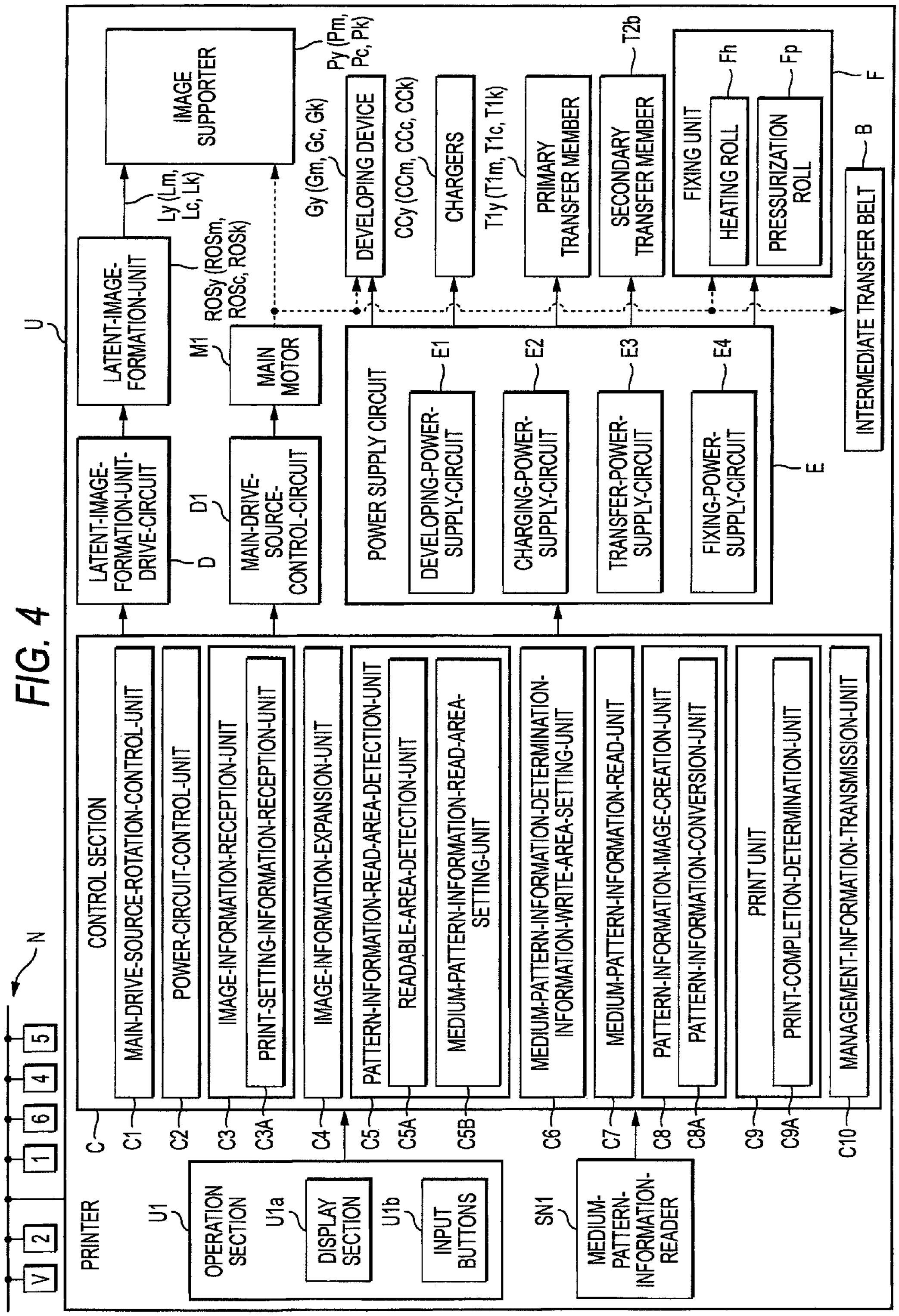
FIG. 4 is a functional block diagram to show the functions of the control section of the first image formation apparatus in the image formation system of the first exemplary embodiment of the invention.

FIG. 4 is a functional block diagram to show the functions of the control section of the first image formation apparatus in the image formation system of the first exemplary embodiment of the invention.

In FIG. 3, the control section C of the printer U of the first exemplary embodiment is implemented as a microcomputer and has an input/output device (I/O) for inputting and outputting signals from and to the outside, adjusting the input/output signal level, etc., storage ROM and an HDD storing programs, information, etc., for performing necessary processing, primary storage RAM for temporarily storing necessary data, a central processing unit (CPU) for performing processing responsive to the programs stored in the storage ROM, HDD, RAM, etc., an oscillator (not shown) for oscillating a periodical signal to synchronize circuitry or a clock, and the like.

In FIGS. 3 and 4, the described printer U can implement various functions by executing image formation programs stored in the read-only memory ROM, the hard disk drive HDD as an example of storage, the random access memory RAM as an example of primary storage, etc.

(Signal Input Elements Connected to Control Section C)

Output signals of the operation section U1, the medium-pattern-information-reader SN1, and other signal output elements, etc., are input to the control section C.

U1: Operation Section

In FIG. 4, the operation section U1 includes the display section U1*a* for displaying an image, the input buttons U1*b* for executing various inputs, etc. For example, a liquid crystal display can be used as the display section U1*a*, and numeric keys, a copy start key, etc., can be named as the input buttons U1*b*.

SN1: Medium-pattern-information-reader

The medium-pattern-information-reader SN1 reads pattern information of the surface of the record sheet S passing through the position of the medium-pattern-information-reader SN1 or so-called paper fingerprint.

(Controlled Elements Connected to Control Section C)

The control section C outputs controls signals of the following controlled elements:

D1: Main-drive-source-control-circuit

The main-drive-source-control-circuit D1 drives a main motor M1 as an example of a main drive source, thereby rotating and driving the image supporters Py, Pm, Pc, and Pk, the secondary transfer member T2*b*, the fixing unit F, the intermediate transfer belt B, and the like.

E: Power Supply Circuit

The power supply circuit E has a developing-power-supply-circuit E1 for applying a developing voltage to the developing devices Gy, Gm, Gc, and Gk, a charging-power-supply-circuit E2 for applying a charging voltage to the chargers CCy, CCm, CCc, and CCk, a transfer-power-supply-circuit E3 for applying a transfer voltage to the primary transfer members T1*y*, T1*m*, T1*c*, and T1*k* and the secondary transfer member T2*b*, and a fixing-power-supply-circuit E4 for supplying heating power to the fixing unit F.

D: Latent-image-formation-unit-drive-circuit

The latent-image-formation-unit-drive-circuit D controls the latent-image-formation-units ROSy, ROSm, ROSc, and ROSk to form a latent image.

(Functions of Control Section C)

In FIG. 4, the control section C has function implementation units for implementing functions of executing processing responsive to the output signals from the signal output elements and outputting control signals to the control elements, namely, program modules making up the image formation program. The function implementation units for implementing the various functions of the control section C will be discussed below:

C1: Main-drive-source-rotation-control-unit

The main-drive-source-rotation-control-unit C1 controls the operation of the main motor M1 through the main-drive-source-control-circuit D1 to control rotation of the image supporters Py, Pm, Pc, and Pk, etc.

C2: Power-circuit-control-unit

The power-circuit-control-unit C2 controls the power supply circuit E to control the developing voltage, the charging voltage, the transfer voltage, and the fixing temperature.

C3: Image-information-reception-unit

The image-information-reception-unit C3 has a print-setting-information-reception-unit C3A and receives and stores image information to be printed, transmitted from the terminals 1 and 4 to 6.

C3A: Print-setting-information-reception-unit

The print-setting-information-reception-unit C3A receives and stores information concerning print settings at the time of printing the image information transmitted from the terminals 1 and 4 to 6. In the first exemplary embodiment, the print settings contain post-treatment information of corner binding setting of binding a corner of a record sheet bundle, edge binding setting of binding along the edge of a record sheet bundle, and binding hole making setting of making a binding hole using the edge binding unit HTS, and saddle stitching setting of performing saddle stitching and folding double using the saddle stitching unit NTS, etc., and information of the size, the type, etc., of medium S. That is, the print-setting-information-reception-unit C3A receives and stores the print setting information containing the post-treatment information.

C4: Image-information-expansion-unit

The image-information-expansion-unit C4 expands received image information into print image information of print information.

Figure 5C:
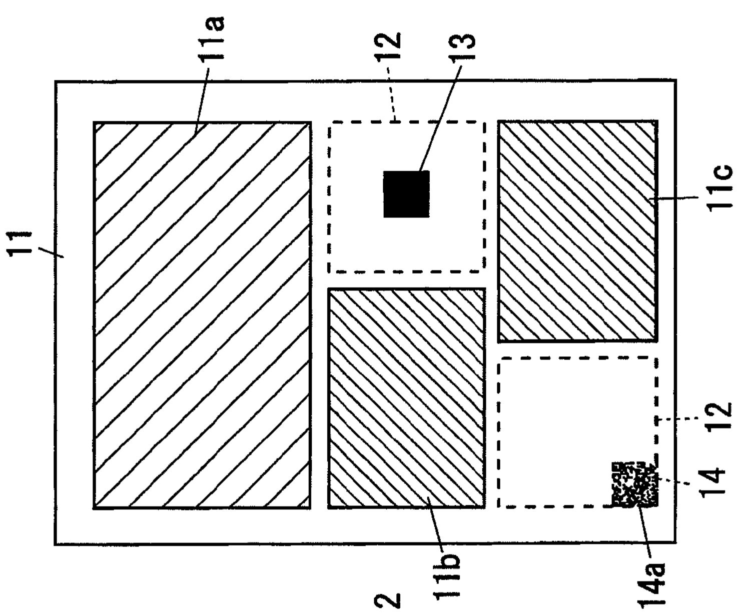
FIGS. 5A to 5C are a schematic representation of an example of a print image of the first exemplary embodiment of the invention.
Figure 5B:
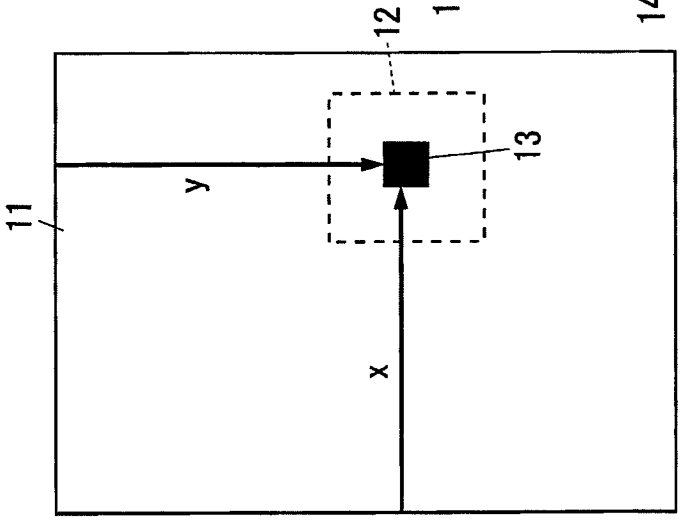
Figure 5A:
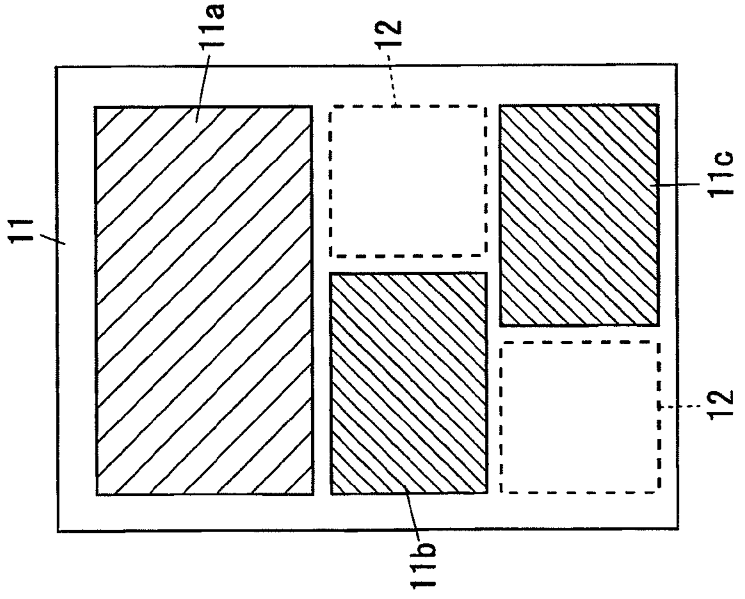

FIGS. 5A to 5C is a schematic representation of an example of a print image of the first exemplary embodiment of the invention; FIG. 5A is a schematic representation of a received print image; FIG. 5B is a schematic representation of a pattern-information-read-area; and FIG. 5C is a schematic representation of a print image to which medium-pattern-information-determination-information is added.

C5: Pattern-information-read-area-detection-unit

The pattern-information-read-area-detection-unit C5 has a readable-area-detection-unit C5A and a medium-pattern-information-read-area-setting-unit C5B and detects a pattern-information-read-area 13 where paper fingerprint of medium pattern information is read in a print image 11 of one page to be printed, illustrated in FIGS. 5A to 5C based on the provided print image information.

Figure 6A:
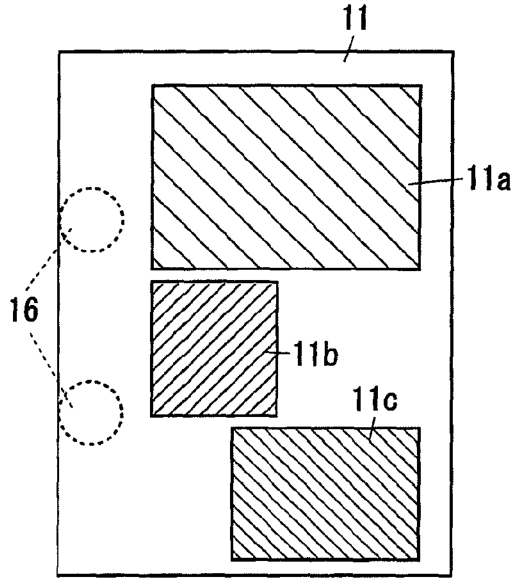
FIGS. 6A to 6D are a schematic representation of an example of a print image for which print settings of the first exemplary embodiment of the invention are made.
Figure 6B:
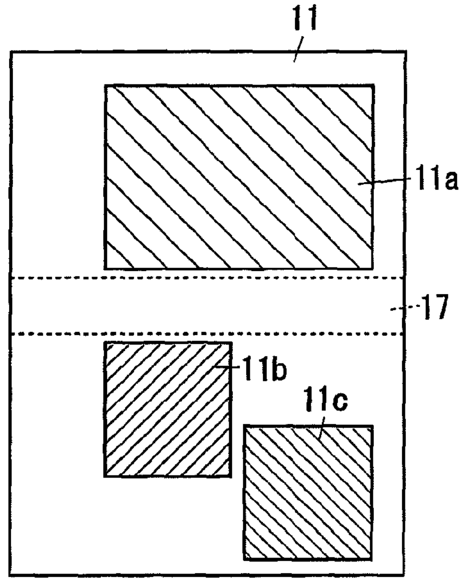
Figure 6C:
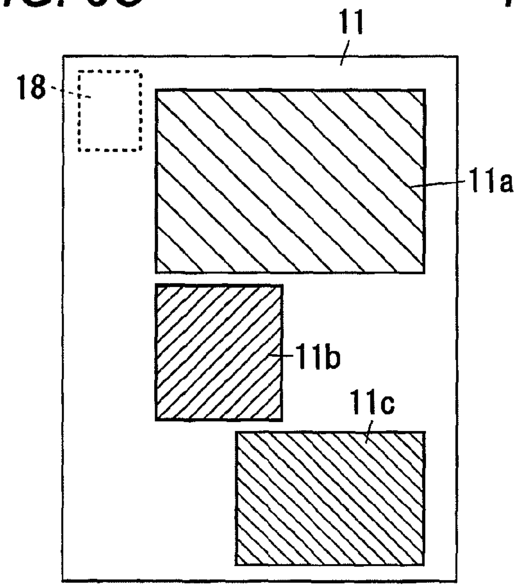
Figure 6D:
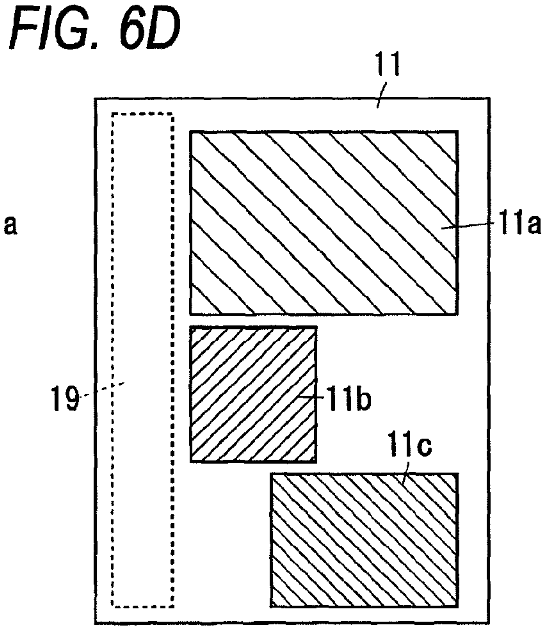

FIGS. 6A to 6D are a schematic representation of an example of a print image for which print settings of the first exemplary embodiment of the invention are made; FIG. 6A is a schematic representation when binding hole making setting is made; FIG. 6B is a schematic representation when saddle stitching setting is made; FIG. 6C is a schematic representation when corner binding setting is made; and FIG. 6D is a schematic representation when edge binding setting is made.

C5A: Readable-area-detection-unit

In FIGS. 3 and 5, the readable-area-detection-unit C5A detects any area other than image areas 11*a* to 11*c* of a preset extent or more, for example, an area of a blank image 12 where an image of an extent measuring several mm per side is not printed as a pattern information readable area 12 in the provided one-page print image 11. The readable-area-detection-unit C5A of the first exemplary embodiment excludes the pattern information readable area 12 duplicate with the area where treatment is to be executed based on the print setting information. For example, in FIGS. 6A to 6D, a binding hole making area 16 where binding holes are made, a saddle stitching area 17 folded double where saddle stitching is performed, a corner binding area 18 where corner binding is to be performed, and an edge binding area 19 where edge binding is to be performed are excluded from the pattern information readable areas 12 for detection because it becomes impossible to read medium pattern information after print or pattern information changes because of bending, etc., even if an area of a blank image is detected in the corresponding area if any post-treatment is to be executed according to the print setting information.

C5B: Medium-pattern-information-read-area-setting-unit

The medium-pattern-information-read-area-setting-unit C5B sets a medium-pattern-information-read-area 13 of an area where medium pattern information is to be actually read in a record sheet S on which an actual image is to be printed based on the readable areas 12 detected in the readable-area-detection-unit C5A. If the readable-area-detection-unit C5A detects only one readable area 12, the medium-pattern-information-read-area-setting-unit C5B of the first exemplary embodiment of the invention sets a pattern-information-read-area 13 in the detected area; if the readable-area-detection-unit C5A detects more than one readable area 12, the medium-pattern-information-read-area-setting-unit C5B sets a pattern-information-read-area 13 where pattern information is to be actually read in any one of the detected areas. For example, the pattern-information-read-area 13 can be set in the smallest readable area 12 or can be set in the area 12 near to the margin of the print area 11.

C6: Medium-pattern-information-determination-information-write-area-setting-unit The medium-pattern-information-determination-information-write-area-setting-unit C6 sets a medium-pattern-information-determination-information-write-area 14 of an area where medium-pattern-information-determination-information to determine medium pattern information of the pattern-information-read-area 13 is written in the print image 11. The medium-pattern-information-determination-information-write-area-setting-unit C6 of the first exemplary embodiment sets an area of an extent where already known two-dimensional encryption information, for example, QR code (registered trademark) can be used as the medium-pattern-information-determination-information and a medium-pattern-information-determination-information image 14*a* as an example of a medium information image formed of QR code (registered trademark) can be printed as a medium-pattern-information-determination-information-write-area 14. The medium-pattern-information-determination-information-write-area-setting-unit C6 of the first exemplary embodiment sets an area of an extent of the medium-pattern-information-determination-information-write-area 14 or more from among the readable areas 12 of blank images detected in the readable-area-detection-unit C5A as the medium-pattern-information-determination-information-write-area 14. At this time, in the first exemplary embodiment, the medium-pattern-information-determination-information-write-area 14 is set so as not to be duplicate with the pattern-information-read-area 13; if both the medium-pattern-information-determination-information-write-area 14 and the pattern-information-read-area 13 are set in the same readable area 12, they are set in different positions.

C7: Medium-pattern-information-read-unit

The medium-pattern-information-read-unit C7 reads pattern information of the surface of a record sheet S of a medium by the medium-pattern-information-reader SN1. The medium-pattern-information-read-unit C7 of the first exemplary embodiment controls the medium-pattern-information-reader SN1 and reads the medium pattern information at the position corresponding to the pattern-information-read-area 13 set for the record sheet S passing through the position of the medium-pattern-information-reader SN1. The medium-pattern-information-read-unit C7 of the first exemplary embodiment reads pattern information of the medium surface occurring depending on the fiber overlapping state or pattern information of the medium surface like so-called paper fingerprint.

C8: Pattern-information-image-creation-unit

The pattern-information-image-creation-unit C8 has a pattern-information-conversion-unit C8A and creates a pattern information image added to the print image 11. The pattern-information-image-creation-unit C8 of the first exemplary embodiment encrypts medium-pattern-information-determination-information containing image information of the read medium pattern information, coordinate information of the pattern-information-read-area 13 as shown in FIG. 5B as an example of pattern information position information, and identification information of the medium S like a serial number into QR code (registered trademark) by the pattern-information-conversion-unit C8A, thereby creating a pattern information image 14*a* formed of the QR code (registered trademark). The positions in the main scanning direction and the subscanning direction relative to the reference position of the medium S can be adopted as the coordinate information. For example, the number of pixels or the distance from the reference position can be adopted as the position. The reference position can be set to any position that can be adopted, such as a corner of the medium S or a corner or the center of an effective image formation area. Information concerning the orientation of the record sheet S of a medium and the size of the pattern-information-read-area 13 can also be contained in the coordinate information. For example, the main scanning direction and the subscanning direction can be adopted as the orientation of the record sheet S, namely, the detection direction of paper fingerprint. For example, the vertical and horizontal numbers of pixels or the vertical and horizontal lengths of the pattern-information-read-area 13 can be adopted as the size of the pattern-information-read-area 13.

C9: Print Unit

The print unit C9 has a print-completion-determination-unit C9A for determining whether or not print of all pages is complete, and controls drive of, voltage application to, etc., the image supporters Py, Pm, Pc, and Pk, etc., through the main-drive-source-rotation-control-unit C1 and the power-circuit-control-unit C2 and executes print. The print unit C9 of the first exemplary embodiment prints a print image with pattern information provided by adding the created pattern information image 14*a* to the provided print image 11 on the record sheet S. The print unit C9 of the first exemplary embodiment is set so as to print the pattern information image 14*a* in yellow Y hard to view by a human being, but the exemplary embodiment is not limited to the mode and the pattern information image can be printed in any desired color; for example, the pattern information image can also be printed in transparent toner by adding a developing device for transparent toner readable through a reader and invisible for a human being.

C10: Management-information-transmission-unit

The management-information-transmission-unit C10 transmits management information containing medium pattern information and medium-pattern-information-determination-information and formed of information of the print image with pattern information printed to the management apparatus 2 for recoding and registering therein. That is, the management information formed of the print image with pattern information is registered in a database in the management apparatus 2.

(Description of Control Section of Copier V)

Figure 7:
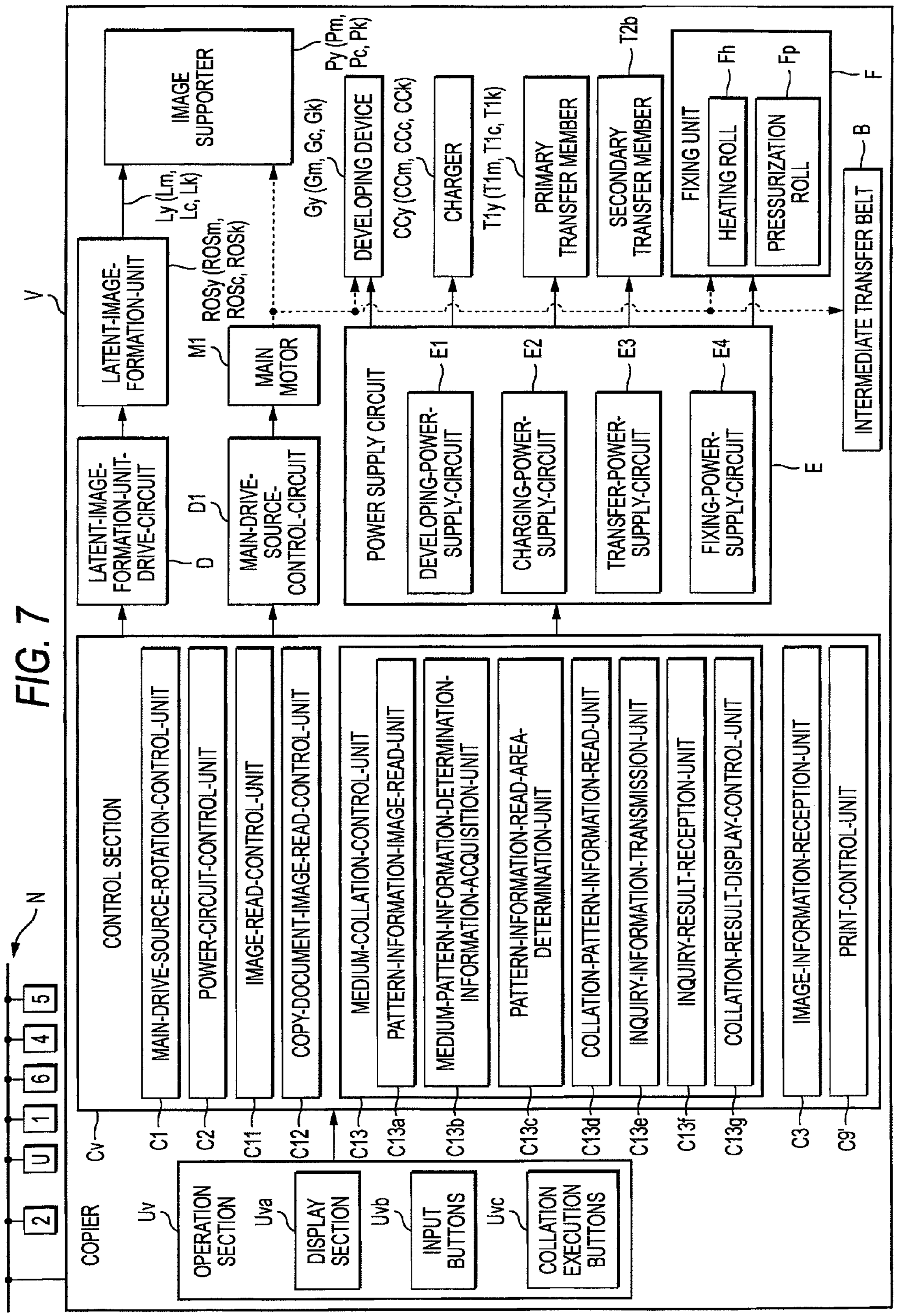
FIG. 7 is a functional block diagram to show the functions of a control section of a copier of the first exemplary embodiment of the invention.

FIG. 7 is a functional block diagram to show the functions of a control section of the copier of the first exemplary embodiment of the invention.

In FIG. 7, a control section Cv of the copier V of the first exemplary embodiment is implemented as a microcomputer and can implement various functions by executing the image formation program like the control section C of the printer U.

(Signal Input Elements Connected to Control Section Cv)

Output signals of an operation section Uv and other signal output elements, etc., are input to the control section Cv.

Uv: Operation Section

The operation section Uv includes a display section Uva for displaying an image, input buttons Uvb for executing various inputs, a collation execution button Uvc for executing collation as to whether or not the medium is the original, etc. For example, a liquid crystal display can be used as the display section U1*a*, and numeric keys, a copy start key, etc., can be named as the input buttons Uvb.

(Controlled Elements Connected to Control Section Cv)

The control section Cv of the copier V of the first exemplary embodiment outputs controls signals of controlled elements like those of the printer U.

(Functions of Control Section Cv)

In FIG. 7, the control section Cv has function implementation units for implementing functions of executing processing responsive to the output signals from the signal output elements and outputting control signals to the control elements, namely, program modules making up the image formation program. The function implementation units for implementing the various functions of the control section Cv will be discussed below. The control section Cv of the copier V of the first exemplary embodiment has control units C1 to C3 similar to those of the control section C of the printer U; the control units C1 to C3 will not be discussed in detail for simplicity of the description.

C11: Image-read-control-unit

The image-read-control-unit C11 has a copy-document-image-read-control-unit C12 and a medium-collation-control-unit C13 and controls the operation of the scanner section V1 to control read of a medium S of a document, etc.

C12: Copy-document-image-read-control-unit

If a copy is input from the input button Uvb, the copy-document-image-read-control-unit C12 controls the operation of the scanner section VI and controls and executes read of a document medium S for copy.

C13: Medium-collation-control-unit

The medium-collation-control-unit C13 has a pattern-information-image-read-unit C13*a*, a medium-pattern-information-determination-information-acquisition-unit C13*b*, a pattern-information-read-area-determination-unit C13*c*, a collation-pattern-information-read-unit C13*d*, an inquiry-information-transmission-unit C13*e*, an inquiry-result-reception-unit C13*f*, and a collation-result-display-control-unit C13*g* and controls collation processing as to whether or not the medium S is the original. If the collation execution button Uvc is input, the medium-collation-control-unit C13 of the first exemplary embodiment reads an image of the medium S to be collated, sends inquiry to the management apparatus 2, and receives and displays the collation result, thereby performing the collation processing sequence.

C13*a*: Pattern-information-image-read-unit

The pattern-information-image-read-unit C13*a* reads the medium S to be collated with the original, thereby reading the pattern information image 14*a* printed on the medium S. The pattern-information-image-read-unit C13*a* of the first exemplary embodiment reads the pattern information image 14*a* by extracting the portion of the QR code (registered trademark) out of the whole read image of the medium S.

C13*b*: Medium-pattern-information-determination-information-acquisition-unit The medium-pattern-information-determination-information-acquisition-unit C13*b* acquires medium-pattern-information-determination-information based on the pattern information image 14*a* read through the pattern-information-image-read-unit C13*a*. The medium-pattern-information-determination-information-acquisition-unit C13*b* of the first exemplary embodiment decrypts the QR code (registered trademark), thereby acquiring the medium-pattern-information-determination-information containing the image information of the medium pattern information, the coordinate information of the pattern-information-read-area 13, and the identification information of the medium S.

C13*c*: Pattern-information-read-area-determination-unit

The pattern-information-read-area-determination-unit C13*c* determines the pattern-information-read-area 13 based on the acquired medium-pattern-information-determination-information. The pattern-information-read-area-determination-unit C13*c* of the first exemplary embodiment determines the pattern-information-read-area 13 on the medium S based on the coordinate information of the pattern-information-read-area 13 contained in the acquired pattern-information-read-area 13.

C13*d*: Collation-pattern-information-read-unit

The collation-pattern-information-read-unit C13*d* reads the medium pattern information of the pattern-information-read-area 13 of the medium S to be collated based on the acquired pattern-information-read-area 13, and acquires the information as the collation pattern information.

C13*e*: Inquiry-information-transmission-unit

The inquiry-information-transmission-unit C13*e* transmits inquiry information for inquiring whether or not the medium S to be collated is the original to the management apparatus 2. The inquiry-information-transmission-unit C13*e* of the first exemplary embodiment creates and transmits inquiry information containing the read collation pattern information and the identification information of the medium S contained in the medium-pattern-information-determination-information.

C13*f*: Inquiry-result-reception-unit

The inquiry-result-reception-unit C13*f* receives information of the inquiry result transmitted from the management apparatus 2 in response to the inquiry information transmitted by the inquiry-information-transmission-unit C13*e*. The inquiry result information of the first exemplary embodiment contains the collation result as to whether or not the medium S collated with the original is the original.

C13*g*: Collation-result-display-control-unit

The collation-result-display-control-unit C13*g* controls the display section Uva of the operation section Uv to display the received collation result.

C9': Print Control Unit

The print control unit C9' controls the printer section V2 and controls the print operation thereof in response to the received image information and the read image information of a copy document.

(Description of Control Section of Management Apparatus 2)

Figure 8:
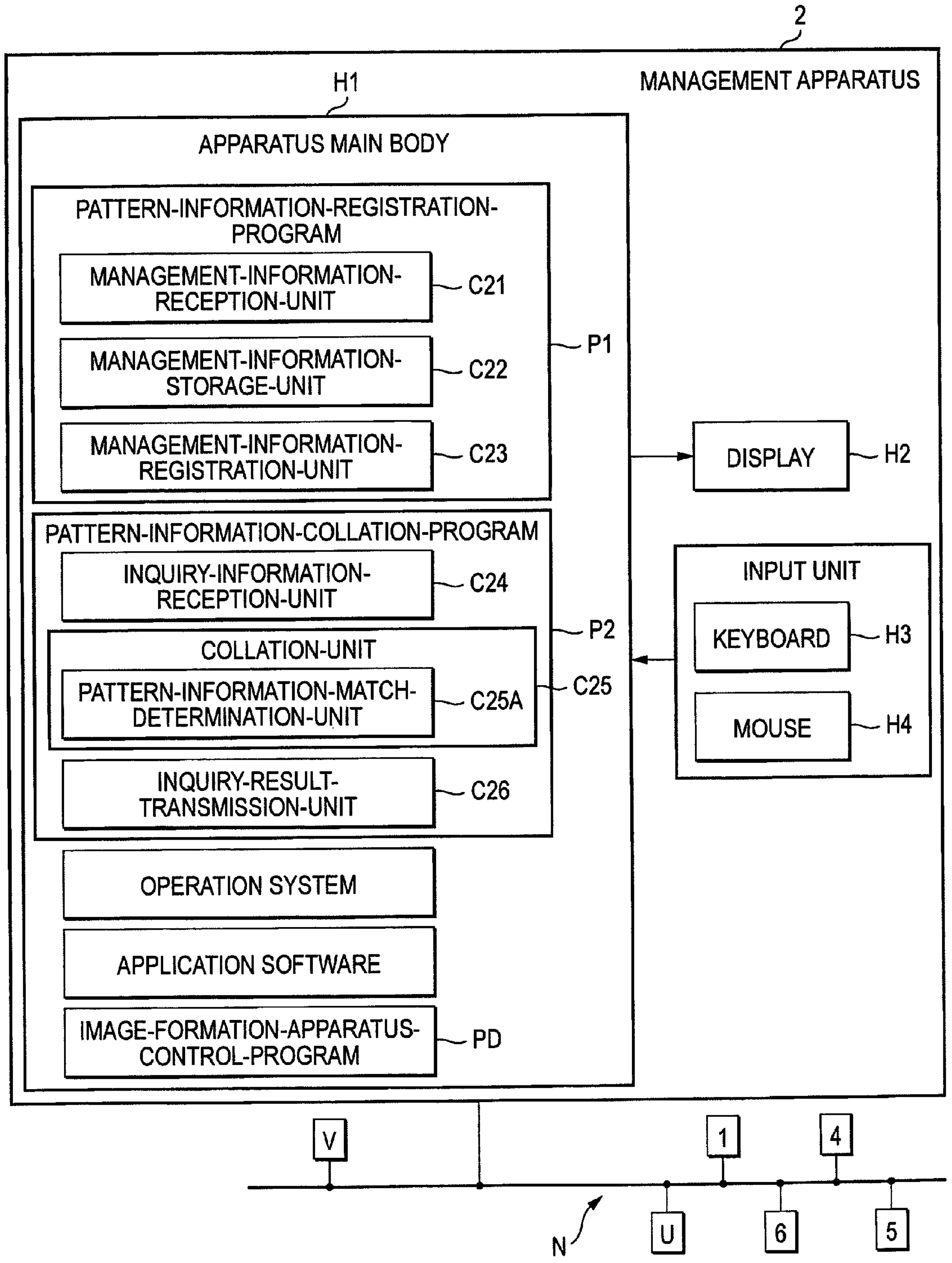
FIG. 8 is a functional block diagram to show the functions of a control section of a management apparatus of the first exemplary embodiment of the invention.

FIG. 8 is a functional block diagram to show the functions of a control section of the management apparatus of the first exemplary embodiment of the invention.

In the management apparatus 2 of the first exemplary embodiment, the apparatus main body H1 is implemented as a computer and like the control section C of the printer U, the control section of the apparatus main body Hi has an input/output device (I/O) for inputting and outputting signals from and to the outside, adjusting the input/output signal level, etc., storage ROM and an HDD storing programs, information, etc., for performing necessary processing, primary storage RAM for temporarily storing necessary data, a central processing unit (CPU) for performing processing responsive to the programs stored in the storage ROM, HDD, RAM, etc., an oscillator (not shown) for oscillating a periodical signal to synchronize circuitry or a clock, and the like.

In the management apparatus 2 of the first exemplary embodiment, the apparatus main body H1 stores a pattern-information-registration-program P1 and a pattern-information-collation-program P2 in addition to the operating system, application software, image-formation-apparatus-control-program PD (printer driver) for transmitting image information and control information to the image formation apparatus, and the like. In the first exemplary embodiment, already known programs can be used as the operating system, the image-formation-apparatus-control-program PD, etc. The pattern-information-registration-program P1 and the pattern-information-collation-program P2 have the following function implementation units:

(Functions of Pattern-information-registration-program P1)

In FIG. 8, the pattern-information-registration-program P1 has the following function implementation units:

C21: Management-information-reception-unit

The management-information-reception-unit C21 receives management information transmitted by the management-information-transmission-unit C10. The management-information-reception-unit C21 of the first exemplary embodiment receives management information containing the medium-pattern-information-determination-information.

C22: Management-information-storage-unit

The management-information-storage-unit C22 stores the management information. The management-information-storage-unit C22 of the first exemplary embodiment stores the image information of the medium pattern information, the coordinate information of the pattern-information-read-area 13, and the identification information of the medium S like a serial number in a database in association with each other based on the medium-pattern-information-determination-information contained in the management information.

C23: Management-information-registration-unit

The management-information-registration-unit C23 registers the image information received in the management-information-reception-unit C21 in the management-information-storage-unit C22 for storage.

(Functions of Pattern-information-collation-program P2)

In FIG. 8, the pattern-information-collation-program P2 has the following function implementation units:

C24: Inquiry-information-reception-unit

The inquiry-information-reception-unit C24 receives inquiry information of information of an inquiry as to whether or not the medium S transmitted from the copier V is the original. The inquiry-information-reception-unit C24 of the first exemplary embodiment receives the inquiry information containing the read collation pattern information and the identification information of the medium S contained in the medium-pattern-information-determination-information, transmitted by the inquiry-information-transmission-unit C13*e*.

C25: Collation Unit

The collation unit C25 has a pattern-information-match-determination-unit C25A and checks whether or not the medium S to be collated with the original is the original based on the received inquiry information. The collation unit C25 of the first exemplary embodiment checks whether or not the medium S is the original by collating the inquiry information with the management information stored in the management-information-storage-unit C22.

C25A: Pattern-information-match-determination-unit

The pattern-information-match-determination-unit C25A determines whether or not the collation pattern information contained in the received inquiry information matches the image information of the medium pattern information contained in the management information stored in the management-information-storage-unit C22. The pattern-information-match-determination-unit C25A of the first exemplary embodiment searches the management information in the management-information-storage-unit C22 for the image information of the medium pattern information based on the identification information contained in the received inquiry information, and determines whether or not the image information of the medium pattern information matches the collation pattern information by conducting an image analysis to check whether or not the medium S is the original. The image analysis will not be discussed here in detail because an already known technology such as a fingerprint collation technology can be used.

C26: Inquiry-result-transmission-unit

The inquiry-result-transmission-unit C26 transmits information of the inquiry result of the collation result of the collation unit C25 to the copier V transmitting the inquiry information.

(Description of Flowcharts of First Exemplary Embodiment)

Next, a processing flow of the printer U of the image formation system S0 of the first exemplary embodiment will be discussed with a flowchart. Processing in the terminals 1 and 4 to 6 for transmitting image information to the printer U in response to input and processing in the management apparatus 2 for registering information of a print image with pattern information transmitted from the printer U in a database are already known and therefore are not shown and will not be discussed here in detail for simplicity.

(Description of Flowchart of Printer U)

(Description of Flowchart of Image Formation Processing)

Figure 9:
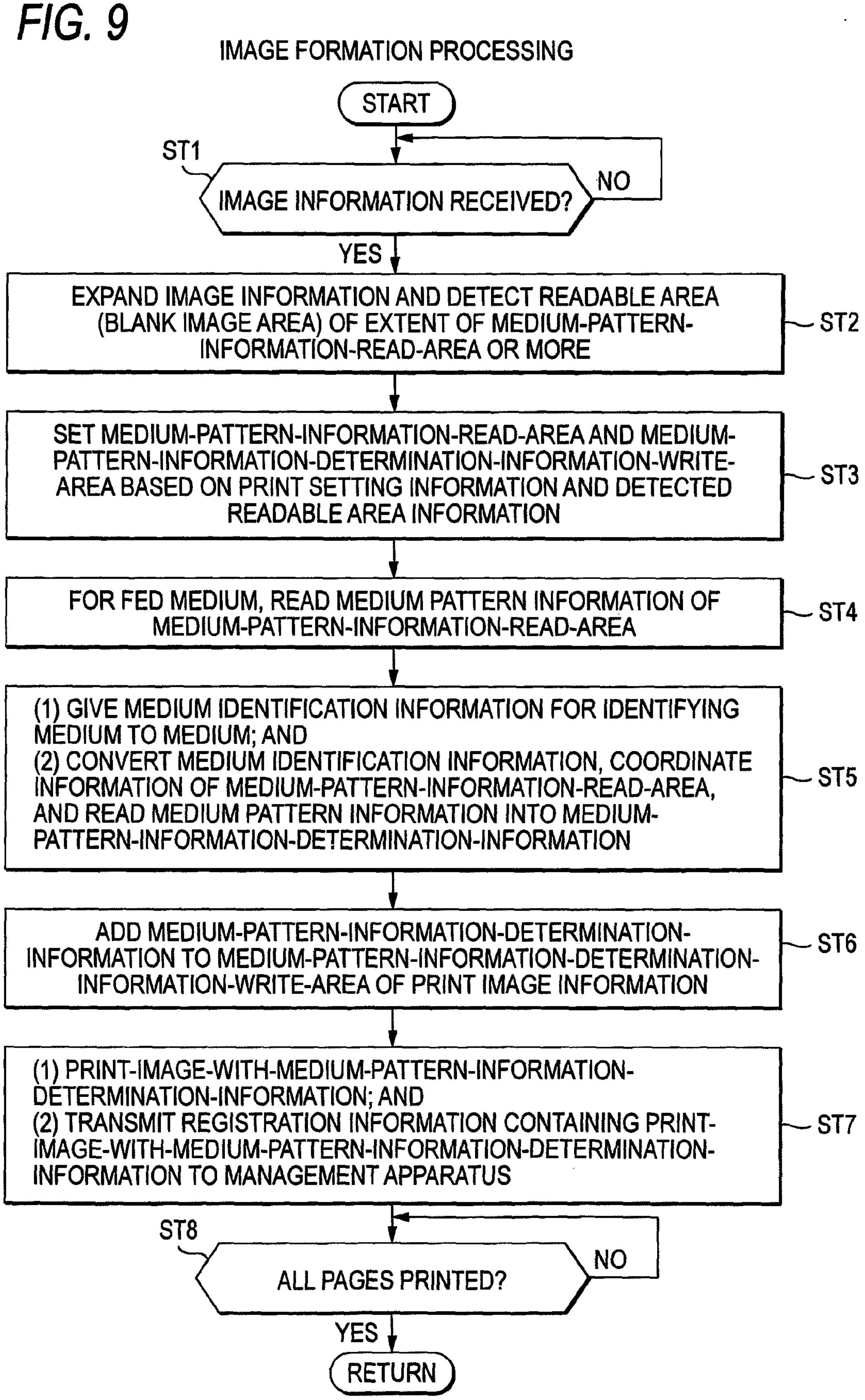
FIG. 9 is a flowchart of image formation processing in the image formation apparatus of the first exemplary embodiment of the invention.

FIG. 9 is a flowchart of image formation processing in the image formation apparatus of the first exemplary embodiment of the invention.

Steps of the flowchart of FIG. 9 are executed in accordance with the image formation program stored on the hard disk, etc., of the printer U. The steps are executed in concurrent processing with other various types of processing of the printer U.

The flowchart of FIG. 9 is started when the user turns on the power of the printer U.

At ST1 in FIG. 9, whether or not print image information transmitted from the terminal 1, 4, 5, or 6 or the management apparatus 2 is received is determined. If the determination result is Yes (Y), the process goes to ST2; if the determination result is No (N), ST1 is repeated.

At ST2, the received image information is expanded and a readable area 12 of a blank image area of an extent of a medium-pattern-information-read-area 13 or more is detected. Then, the process goes to ST3.

At ST3, a medium-pattern-information-read-area 13 and a medium-pattern-information-determination-information-write-area 14 are set based on print setting information and information of the detected readable area 12. Then, the process goes to ST4.

At ST4, for a fed medium S, medium pattern information of the setup medium-pattern-information-read-area 13, for example, paper fingerprint is read. Then, the process goes to ST5.

At ST5, the read medium pattern information is converted into medium-pattern-information-determination-information and a medium-pattern-information-determination-information image 14*a* is created. Then, the process goes to ST6.

At ST6, the medium-pattern-information-determination-information image 14*a* is added to the medium-pattern-information-determination-information-write-area 14 of a print image 11 to create a print image with medium determination information. Then, the process goes to ST7.

At ST7, the following (1) and (2) are executed and then the process goes to ST8:

(1) Print-image-with-medium-pattern-information-determination-information is printed; and (2) management information formed of the print-image-with-medium-pattern-information-determination-information is transmitted to the management apparatus 2 and is registered in the database.

At ST8, whether or not print of all pages of the received image information is complete is determined. If the determination result is No (N), the process returns to ST2; if the determination result is Yes (Y), the process returns to ST1.

(Description of Flowchart of Management Apparatus 2)

(Description of Pattern-information-registration-and-collation-processing)

Figure 10:
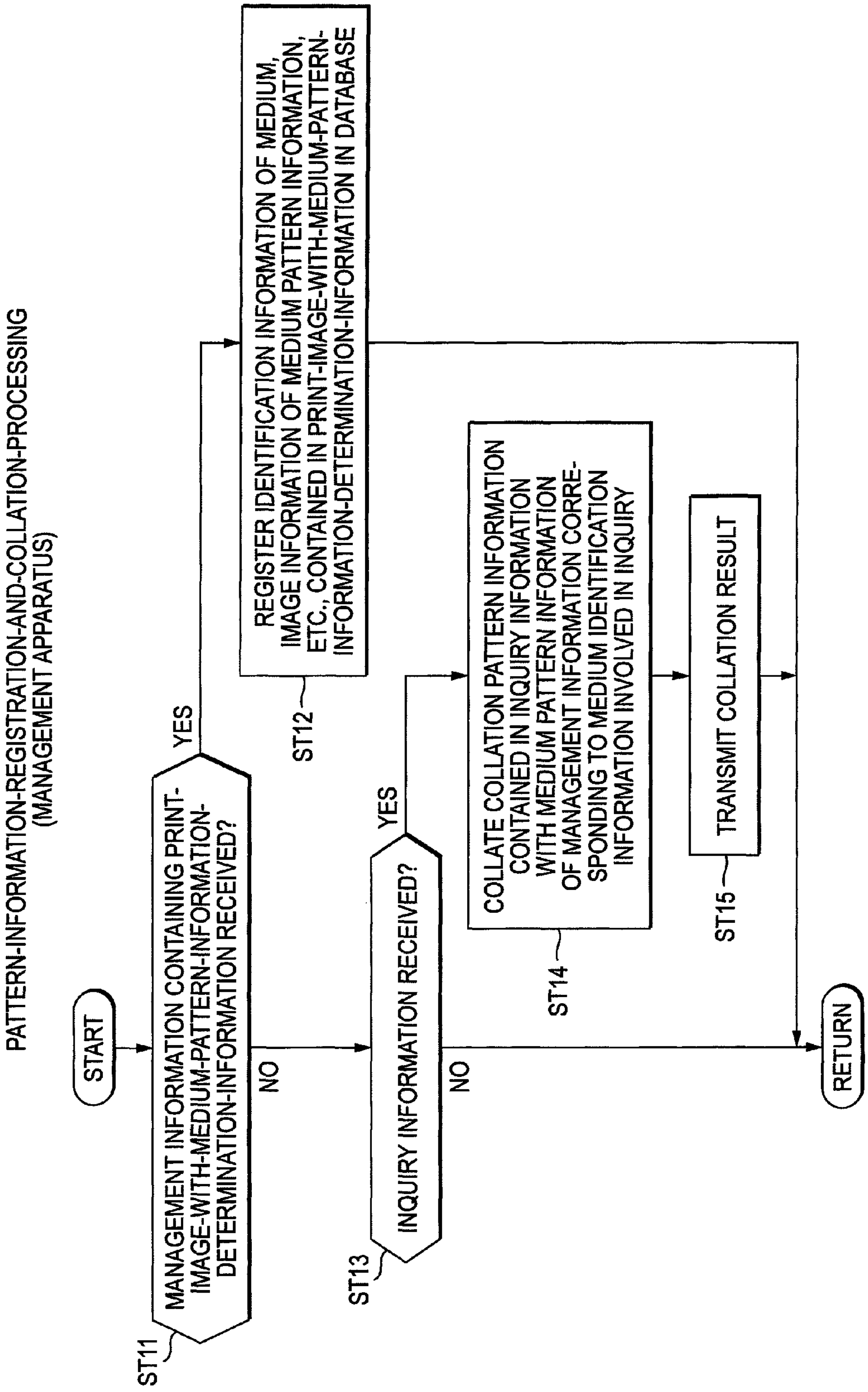
FIG. 10 is a flowchart of pattern-information-registration-and-collation-processing of the management apparatus of the first exemplary embodiment of the invention.

FIG. 10 is a flowchart of pattern-information-registration-and-collation-processing of the management apparatus of the first exemplary embodiment of the invention.

Steps of the flowchart of FIG. 10 are executed in accordance with the pattern-information-registration-program P1 and the pattern-information-collation-program P2 stored on the hard disk, etc., of the management apparatus 2. The steps are executed in concurrent processing with other various types of processing of the management apparatus 2.

The flowchart of FIG. 10 is started when the user turns on the power of the management apparatus 2.

At ST11 in FIG. 10, whether or not management information containing a print-image-with-medium-pattern-information-determination-information, transmitted from the printer U is received is determined. If the determination result is Yes (Y), the process goes to ST12; if the determination result is No (N), the process goes to ST13.

At ST12, the identification information of the medium S, the image information of the medium pattern information, and the coordinate information of the pattern-information-read-area 13 are registered in the database based on the medium-pattern-information-determination-information contained in the print-image-with-medium-pattern-information-determination-information. Then, the process returns to ST11.

At ST13, whether or not inquiry information transmitted from the copier V is received is determined. If the determination result is Yes (Y), the process goes to ST14; if the determination result is No (N), the process returns to ST11.

At ST14, collation pattern information contained in the inquiry information is collated with the image information of the medium pattern information contained in the management information corresponding to the identification information of the medium S involved in the inquiry, thereby determining whether or not the medium S involved in the inquiry is the original. Then, the process goes to ST15.

At ST15, the collation result is transmitted to the copier V and the process returns to ST11.

(Description of Flowchart of Copier V)

(Description of Pattern-information-read-and-inquiry-processing)

Figure 11:
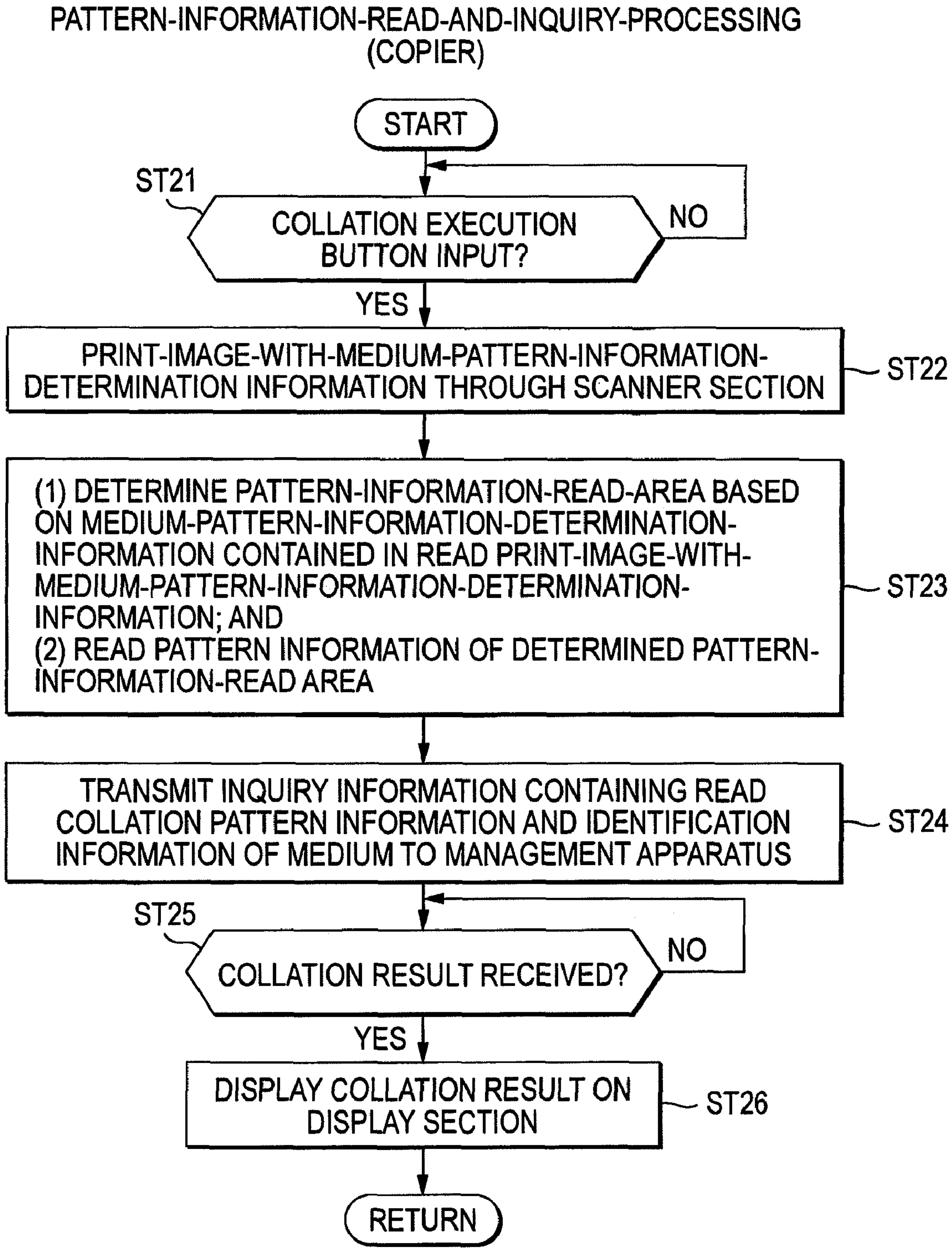
FIG. 11 is a flowchart of pattern-information-read-and-inquiry-processing of the copier V of the first exemplary embodiment of the invention.

FIG. 11 is a flowchart of pattern-information-read-and-inquiry-processing of the copier V of the first exemplary embodiment of the invention.

Steps of the flowchart of FIG. 11 are executed in accordance with the function units stored in the ROM, the hard disk, etc., of the copier V. The steps are executed in concurrent processing with other various types of processing of the copier V.

The flowchart of FIG. 11 is started when the user turns on the power of the copier V.

At ST21 in FIG. 11, whether or not the collation execution button Uvc is input is determined. If the determination result is Yes (Y), the process goes to ST22; if the determination result is No (N), ST21 is repeated.

At ST22, the medium S is read through the scanner section V1 of the copier V and print-image-with-medium-pattern-information-determination-information printed on the medium S is read. Then, the process goes to ST23.

At ST23, the following (1) and (2) are executed and then the process goes to ST24:

(1) Pattern-information-read-area 13 is determined based on the medium-pattern-information-determination-information contained in the read print-image-with-medium-pattern-information-determination-information; and (2) the image information of the medium pattern information of the determined pattern-information-read-area is read as collation pattern information.

At ST24, inquiry information containing the read collation pattern information and the identification information of the medium S contained in the medium-pattern-information-determination-information is transmitted to the management apparatus 2. Then, the process goes to ST25.

At ST25, whether or not collation result information transmitted from the management apparatus 2 in response to the inquiry information is received is determined. If the determination result is Yes (Y), the process goes to ST26; if the determination result is No (N), ST25 is repeated.

At ST26, the received collation result is displayed on the display section Uva. Then, the process returns to ST21.

(Operation of First Exemplary Embodiment)

Upon reception of image information, the image formation system S0 of the first exemplary embodiment including the configuration described above expands the image information into a print image and sets a read area 13 of medium pattern information, for example, paper fingerprint from the provided print image. At this time, an area of a blank image is read based on print setting information, an image is not formed in the paper fingerprint read area 13 at the printing time and it is made possible to reliably read paper fingerprint on the medium S after print. The image formation system S0 of the first exemplary embodiment prints information of the read paper fingerprint and information of the position at which the paper fingerprint is read on the medium S as the medium-pattern-information-determination-information.

The image formation system S0 of the first exemplary embodiment reads the medium S on which the medium-pattern-information-determination-information is printed by the copier V, thereby reading the medium-pattern-information-determination-information, and reads the paper fingerprint in the pattern-information-read-area 13 based on the medium-pattern-information-determination-information and executes collation. The paper fingerprint is information almost unique to each medium S and cannot actually be copied. If paper fingerprint is read and the print image 11 of the medium S into which the medium-pattern-information-determination-information image 14*a* is written is copied when the medium-pattern-information-determination-information image 14*a* of the medium S copied is read and is collated with the paper fingerprint in the medium-pattern-information-read-area 13, the paper fingerprint does not match the paper fingerprint determined by the medium-pattern-information-determination-information image 14*a* and thus it is determined that the medium S is copied medium S and is not the original. On the other hand, if the medium S is the original, the paper fingerprint in the medium-pattern-information-read-area 13 matches the paper fingerprint determined by the medium-pattern-information-determination-information image 14*a* and thus it is determined that the medium S is the original. Therefore, the image formation system S0 of the first exemplary embodiment determines whether or not the medium S to be collated is the original by collating the paper fingerprint in the pattern-information-read-area 13 determined by the read medium-pattern-information-determination-information with the paper fingerprint registered in the management-information-storage-unit C22.

The image formation system S0 of the first exemplary embodiment prints the medium-pattern-information-determination-information image 14*a* in yellow hard to view by a human being and thus unless a human being observes carefully, it is difficult for the human being to recognize formation of the medium-pattern-information-determination-information image 14*a*.

Further, since the image formation system S0 of the first exemplary embodiment encrypts the medium-pattern-information-determination-information image 14*a*, it is difficult to recognize the medium-pattern-information-read-area 13 without decryption and a dishonest act of cutting the medium-pattern-information-read-area 13 of the original and putting it on a copy, for example, is hard to execute.

Second Exemplary Embodiment

Next, a second exemplary embodiment of the invention will be discussed. Components identical with or similar to those of the first exemplary embodiment described above are denoted by the same reference numerals in the description of the second exemplary embodiment and will not be discussed again in detail. The second exemplary embodiment differs from the first exemplary embodiment only in the following point:

(Description of Control Section of Second Exemplary Embodiment)

(Description of Control Section of Terminal)

Figure 12:
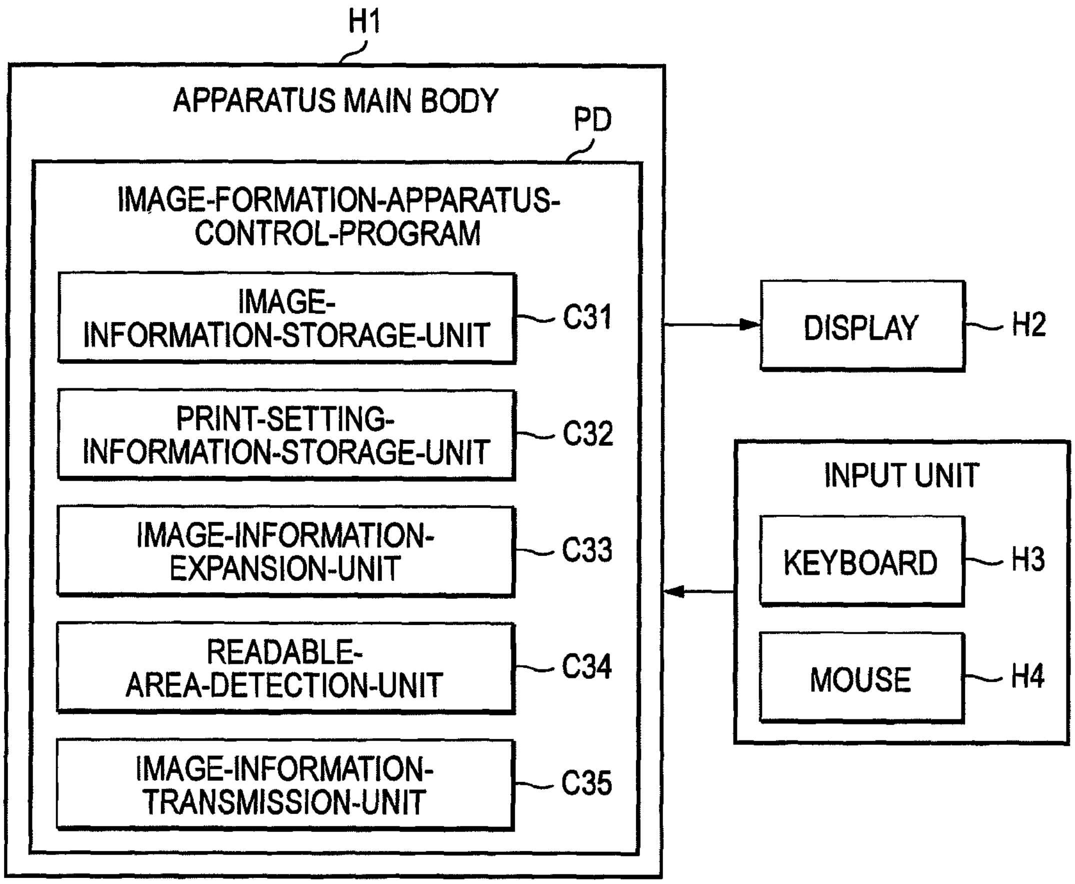
FIG. 12 is a schematic representation of a control section of a terminal of a second exemplary embodiment of the invention.

FIG. 12 is a schematic representation of a control section of a terminal of the second exemplary embodiment of the invention.

In each of terminals 1 and 4 to 6 of the second exemplary embodiment of the invention, an apparatus main body H1 stores an image-formation-apparatus-control-program PD (printer driver) for transmitting image information and control information to an image formation apparatus in addition to an operating system and application software. The image-formation-apparatus-control-program PD has the following function implementation units:

C31: Image-information-storage-unit

The image-information-storage-unit C31 stores image information involved in a print command from the operating system or the application software.

C32: Print-setting-information-storage-unit

It the user of each of the terminals 1 and 4 to 6 makes print setting of post-treatment of saddle stitching, corner binding, etc., the size of a medium S to be printed, etc., the print-setting-information-storage-unit C32 stores information of the made print setting.

C33: Image-information-expansion-unit

The image-information-expansion-unit C33 expands the image information involved in a print command and stored in the image-information-storage-unit C31 into image information for each page.

C34: Readable-area-detection-unit

Like the readable-area-detection-unit C5A of the first exemplary embodiment, the readable-area-detection-unit C34 detects an area of a preset extent or more as a pattern information readable area 12 for each page based on the image information provided by the image-information-expansion-unit C33.

C35: Image-information-transmission-unit

The image-information-transmission-unit C35 transmits transmission information containing readable area information of information concerning the readable area 12 in addition to the image information involved in a print command and the print setting information to a printer U.

(Description of Control Section C of Image Formation Apparatus)

Figure 13:
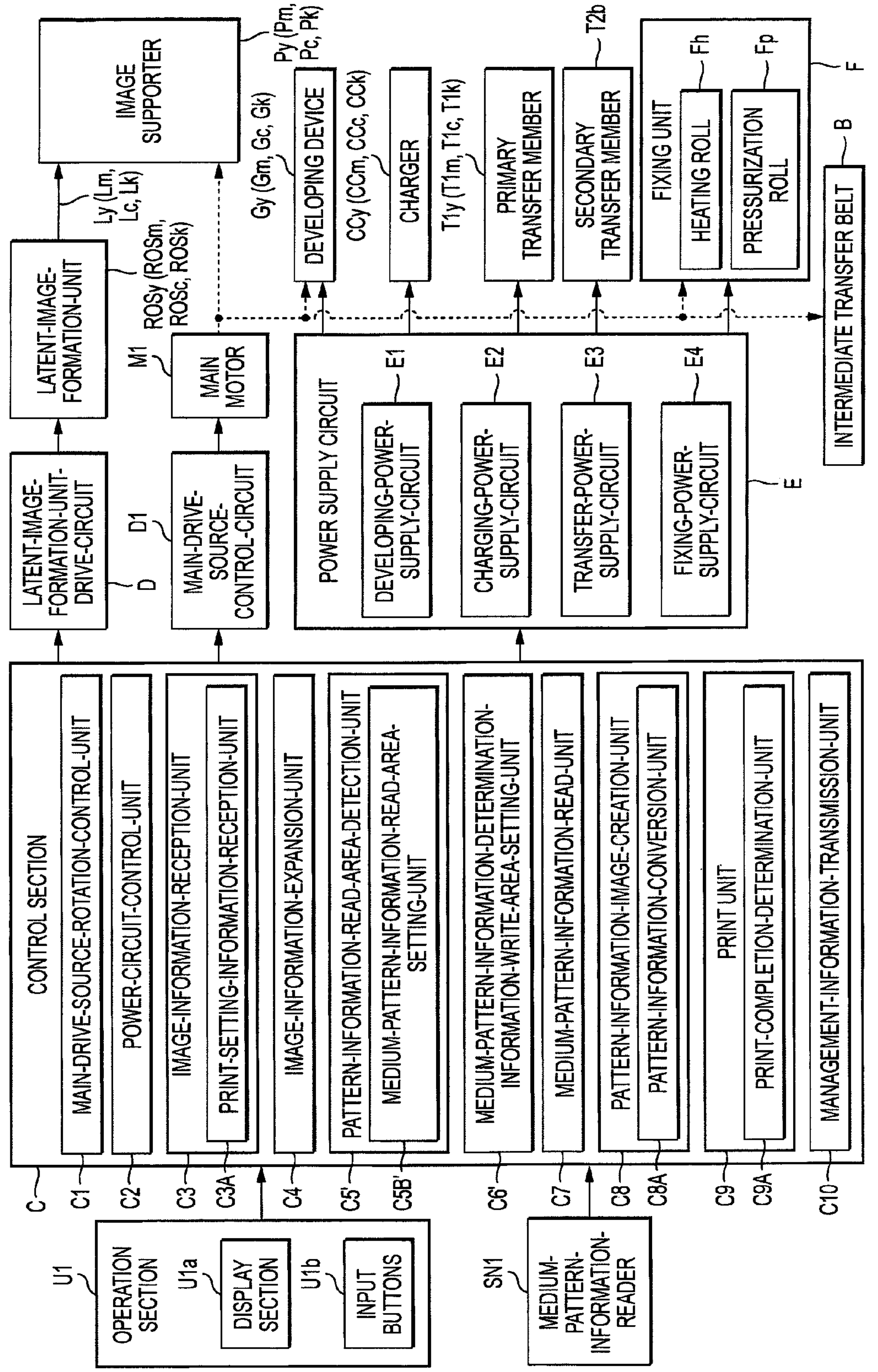
FIG. 13 is a schematic representation of a control section of an image formation apparatus of the second exemplary embodiment of the invention and is a drawing corresponding to FIG. 3 of the first exemplary embodiment.

FIG. 13 is a schematic representation of a control section of the image formation apparatus of the second exemplary embodiment of the invention and is a drawing corresponding to FIG. 3 of the first exemplary embodiment.

In FIG. 13, the printer U of the second exemplary embodiment has a pattern-information-read-area-detection-unit C5' not including the readable-area-detection-unit C5A of the first exemplary embodiment and a medium-pattern-information-determination-information-write-area-setting-unit C6' different from the medium-pattern-information-determination-information-write-area-setting-unit C6 the first exemplary embodiment; other components are similar to those of the first exemplary embodiment.

C5': Pattern-information-read-area-detection-unit

The pattern-information-read-area-detection-unit C5' has a medium-pattern-information-read-area-setting-unit C5B and detects and sets a pattern-information-read-area 13 where paper fingerprint of pattern information of a medium surface is read in a print image 11 of one page to be printed based on print image information provided by an image-information-expansion-unit C4 and the received readable area information.

C5B': Medium-pattern-information-read-area-setting-unit

Unlike the medium-pattern-information-read-area-setting-unit C5B of the first exemplary embodiment, the medium-pattern-information-read-area-setting-unit C5B' sets a medium-pattern-information-read-area 13 of an area where medium pattern information is to be actually read in a record sheet S on which an actual image is to be printed based on the readable areas 12 determined by the received readable area information. A setting technique of the medium-pattern-information-read-area 13 is set as in the first exemplary embodiment.

C6': Medium-pattern-information-determination-information-write-area-setting-unit Unlike the medium-pattern-information-determination-information-write-area-setting-unit C6 of the first exemplary embodiment, the medium-pattern-information-determination-information-write-area-setting-unit C6' sets a medium-pattern-information-determination-information-write-area 14 based on the readable areas 12 determined by the received readable area information. Others are set in a similar manner to that in the first exemplary embodiment.

(Description of Flowcharts of Second Exemplary Embodiment)

Next, a processing flow of the printer U of an image formation system S0 of the second exemplary embodiment will be discussed with a flowchart. In the description of the flowcharts of the second exemplary embodiment, steps similar to those of the first exemplary embodiment are given the same ST numbers and will not be discussed again in detail.

(Description of Flowchart of Terminal)

Figure 14:
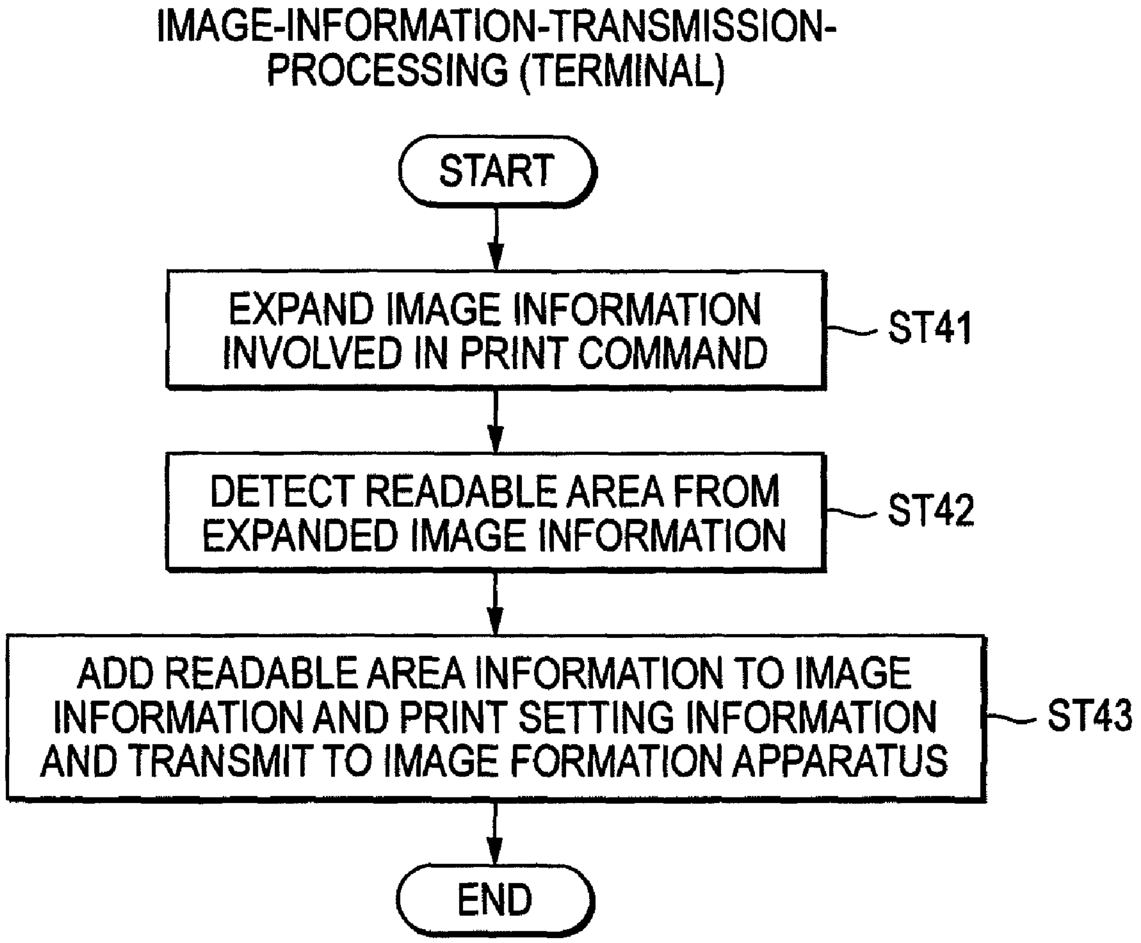
FIG. 14 is a flowchart of image-information-transmission-processing in the terminal of the second exemplary embodiment of the invention.

FIG. 14 is a flowchart of image-information-transmission-processing in the terminal of the second exemplary embodiment of the invention.

Steps of the flowchart of FIG. 14 are executed in accordance with the image-formation-apparatus-control-program PD stored on the hard disk, etc., contained in the apparatus main body H1 of the terminal 1, 4, 5, 6. The steps are executed in concurrent processing with other various types of processing of the terminal 1, 4, 5, 6.

The flowchart of FIG. 14 is started when a print command is given in the application program, etc., and the image-formation-apparatus-control-program PD is read.

At ST41 in FIG. 14, image information involved in a print command is expanded. Then, the process goes to ST42.

At ST42, a readable area 12 (in the second exemplary embodiment, a blank image area) is detected from the expanded image information. Then, the process goes to ST43.

At ST43, transmission information provided by adding readable area information to image information and print setting information is transmitted to the printer U. Then, the image-information-transmission-processing is terminated.

(Description of Flowchart of Printer U)

(Description of Flowchart of Image Formation Processing)

Figure 15:
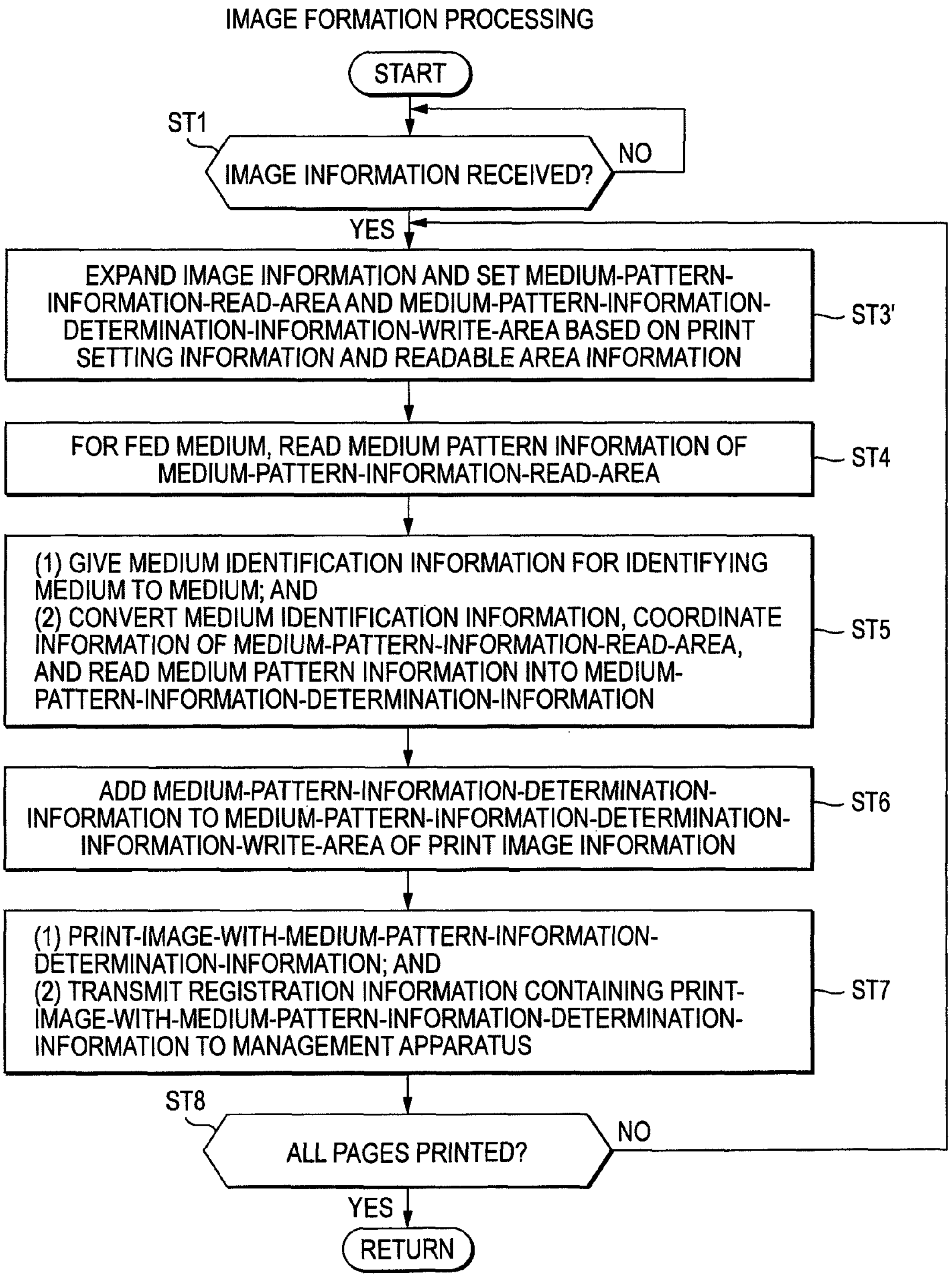
FIG. 15 is a flowchart of image formation processing in the image formation apparatus of the second exemplary embodiment of the invention and is a flowchart corresponding to FIG. 9 of the first exemplary embodiment of the invention.

FIG. 15 is a flowchart of image formation processing in the image formation apparatus of the second exemplary embodiment of the invention and is a flowchart corresponding to FIG. 9 of the first exemplary embodiment of the invention.

Steps of the flowchart of FIG. 15 are executed in accordance with the image formation program stored on the hard disk, etc., of the printer U. The steps are executed in concurrent processing with other various types of processing of the printer U.

The image formation processing in the second exemplary embodiment in FIG. 15 is the same as that in the first exemplary embodiment except that ST3' is executed in place of ST2 and ST3 in the first exemplary embodiment previously described with reference to FIG. 9 and therefore ST1 and ST4 to ST8 will not be discussed again in detail.

At ST3' in FIG. 15, received image information is expanded and a medium-pattern-information-read-area 13 and a medium-pattern-information-determination-information-write-area 14 are set based on received print setting image and readable area information. Then, the process goes to ST4.

(Operation of Second Exemplary Embodiment)

In the printer U of the second exemplary embodiment including the configuration described above, processing of detecting a readable area 12 where a pattern-information-read-area 13 to read medium pattern information or a medium-pattern-information-determination-information-write-area 14 into which a medium-pattern-information-determination-information image 14*a* is written are set is executed in the terminal 1, 4, 5, 6 rather than in the printer U as in the first exemplary embodiment. In the printer U, the readable area 12 is detected and the medium-pattern-information-read-area 13 and the medium-pattern-information-determination-information-write-area 14 are set based on the readable area information transmitted from the terminal 1, 4, 5, 6; the processing load on the printer U is decreased.

Third Exemplary Embodiment

Next, a third exemplary embodiment of the invention will be discussed. Components identical with or similar to those of the first exemplary embodiment described above are denoted by the same reference numerals in the description of the third exemplary embodiment and will not be discussed again in detail. The third exemplary embodiment differs from the first exemplary embodiment only in the following point:

(Description of Control Section of Third Exemplary Embodiment)

(Description of Control Section C of Image Formation Apparatus)

Figure 16:
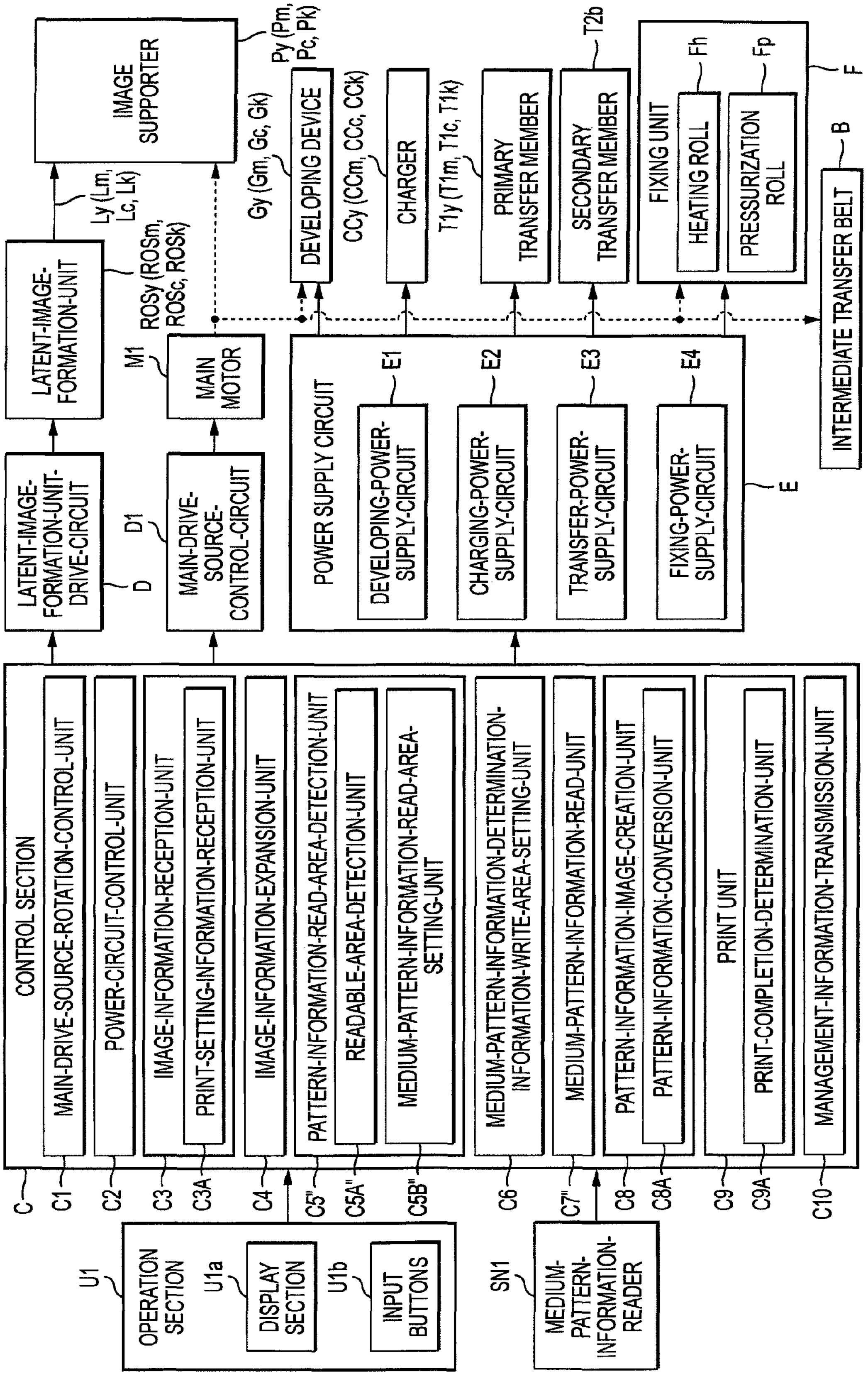
FIG. 16 is a schematic representation of a control section of an image formation apparatus of a third exemplary embodiment of the invention and is a drawing corresponding to FIG. 3 of the first exemplary embodiment of the invention.

FIG. 16 is a schematic representation of a control section of an image formation apparatus of the third exemplary embodiment of the invention and is a drawing corresponding to FIG. 3 of the first exemplary embodiment of the invention.

In FIG. 16, a printer U of the third exemplary embodiment has a pattern-information-read-area-detection-unit C5" and a medium-pattern-information-read-unit C7" different from the pattern-information-read-area-detection-unit C5 and the medium-pattern-information-read-unit C7 of the first exemplary embodiment; other components are similar to those of the first exemplary embodiment.

Figures 17A, 17B, 17C:
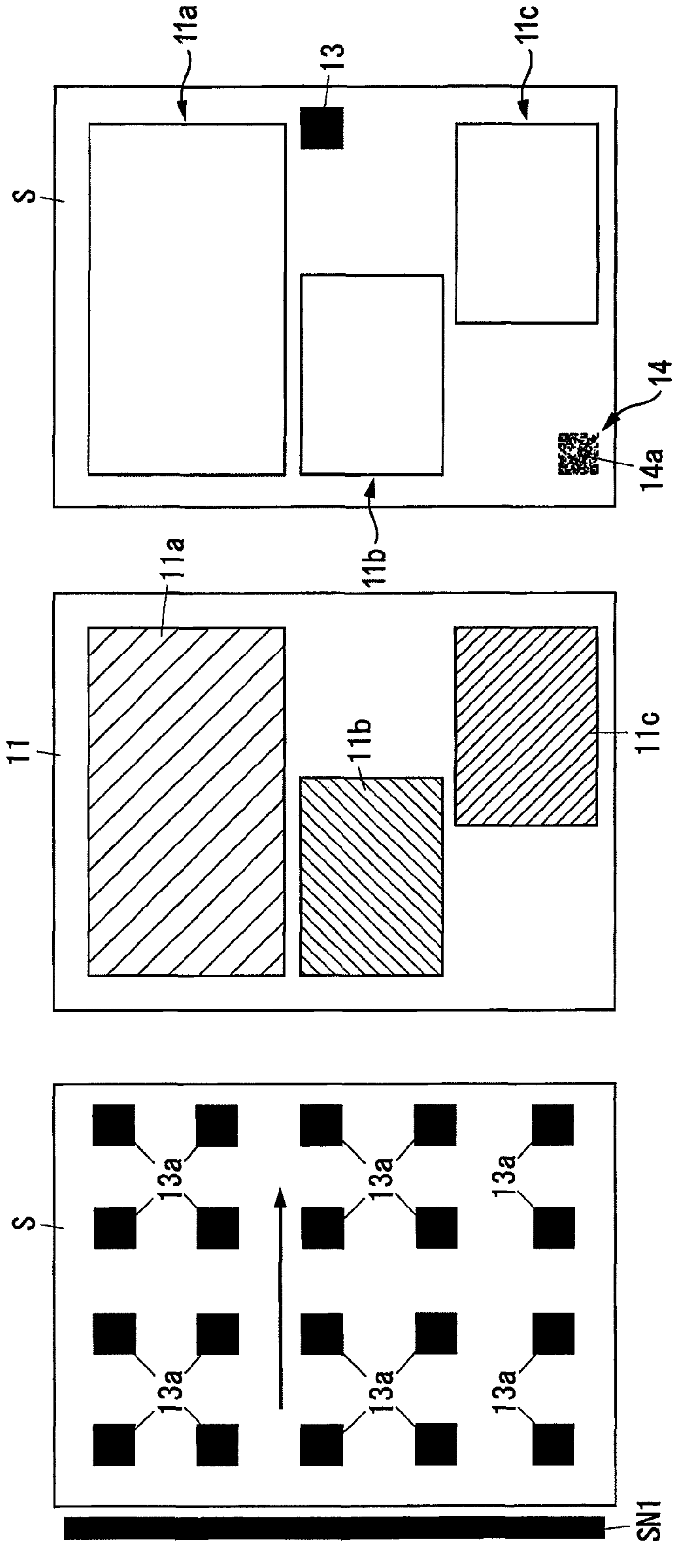
FIGS. 17A to 17C are a schematic representation of an example of a print image of the third exemplary embodiment of the invention.

FIGS. 17A to 17C are a schematic representation of an example of a print image of the third exemplary embodiment of the invention; FIG. 17A is a schematic representation of a medium-pattern-information-read-area; FIG. 17B is a schematic representation of a print image; and FIG. 17C is a schematic representation of a print-image-with-medium-pattern-information-determination-information, C7": Medium-pattern-information-read-unit The medium-pattern-information-read-unit C7" reads pattern information of the surface of a record sheet S of a medium by a medium-pattern-information-reader SN1. In FIGS. 17A to 17C, the medium-pattern-information-read-unit C7" of the third exemplary embodiment controls the medium-pattern-information-reader SN1 and reads the medium pattern information in a pattern-information-read-area 13*a* set with a predetermined spacing in a main scanning direction, namely, the medium width direction and also with a predetermined spacing in a subscanning direction, namely, the medium conveying direction for the record sheet S passing through the position of the medium-pattern-information-reader SN1.

C5": Pattern-information-read-area-detection-unit

The pattern-information-read-area-detection-unit C5" has a readable-area-detection-unit C5A" and a medium-pattern-information-read-area-setting-unit C5B" and detects and sets a pattern-information-read-area 13 where read medium pattern information is used in a print image 11 of one page to be printed.

C5A": Readable-area-detection-unit

The readable-area-detection-unit C5A" detects a readable area 12 of an extent of a medium-pattern-information-determination-information-write-area 14 or more in the print image 11 of one page expanded.

C5B": Medium-pattern-information-read-area-setting-unit

The medium-pattern-information-read-area-setting-unit C5B" sets a medium-pattern-information-read-area 13 for the print image 11. The medium-pattern-information-read-area-setting-unit C5B" of the third exemplary embodiment detects a pattern-information-read-area 13*a* not duplicate with any of image areas 11*a* to 11*c*, of pattern-information-read-areas 13*a* where medium pattern information is read, and sets the pattern-information-read-area 13*a* (if more than one pattern-information-read-area 13*a* is detected, any one of them) as a pattern-information-read-area 13.

(Description of Flowcharts of Third Exemplary Embodiment)

Next, a processing flow of the printer U of an image formation system S0 of the third exemplary embodiment will be discussed with a flowchart. In the description of the flowcharts of the third exemplary embodiment, steps similar to those of the first exemplary embodiment are given the same ST numbers and will not be discussed again in detail.

(Description of Flowchart of Printer U)

(Description of Flowchart of Image Formation Processing)

Figure 18:
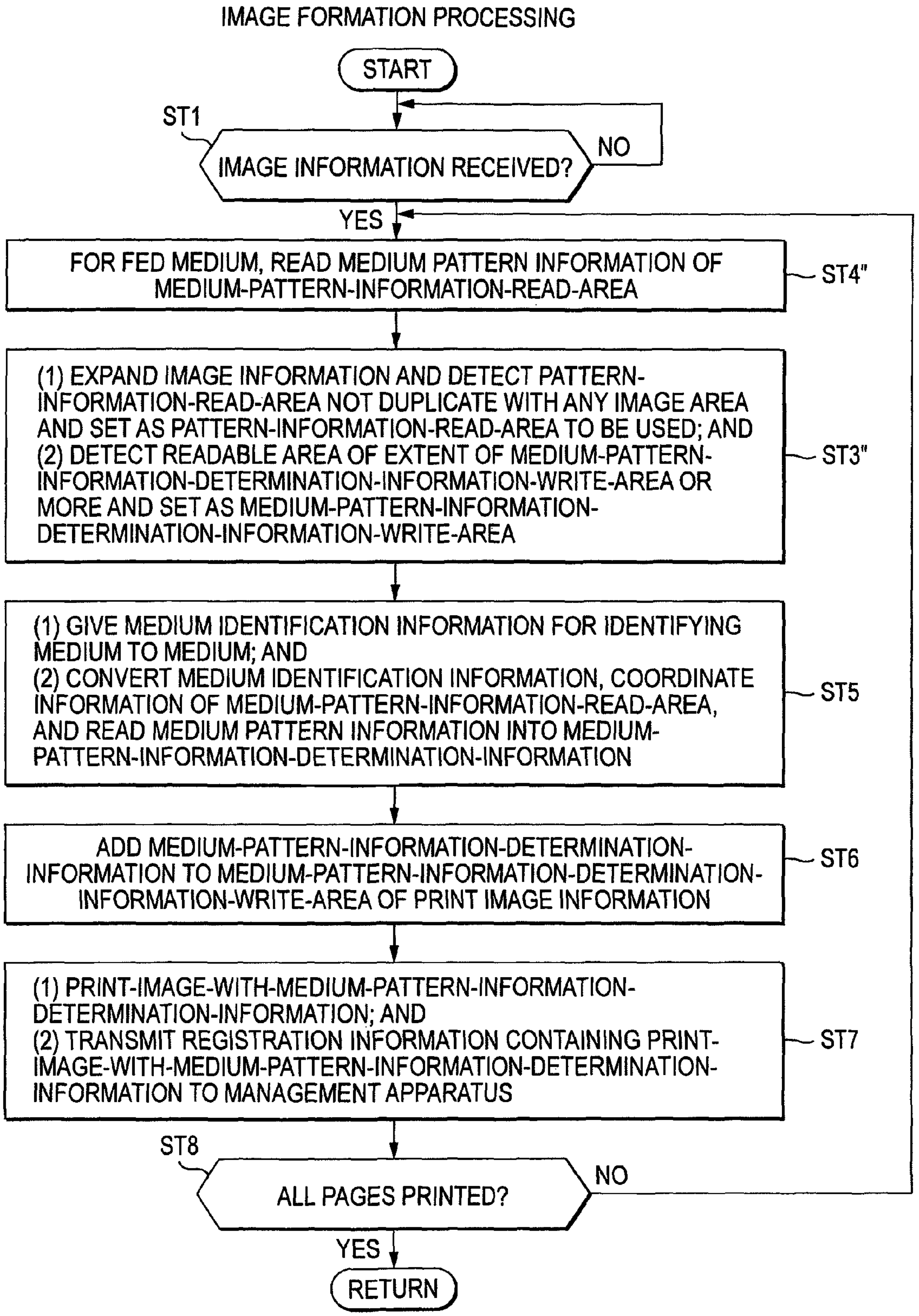
FIG. 18 is a flowchart of image formation processing in the image formation apparatus of the third exemplary embodiment of the invention and is a flowchart corresponding to FIG. 9 of the first exemplary embodiment of the invention.

FIG. 18 is a flowchart of image formation processing in the image formation apparatus of the third exemplary embodiment of the invention and is a flowchart corresponding to FIG. 9 of the first exemplary embodiment of the invention.

Steps of the flowchart of FIG. 18 are executed in accordance with the image formation program stored on the hard disk, etc., of the printer U. The steps are executed in concurrent processing with other various types of processing of the printer U.

The image formation processing in the third exemplary embodiment in FIG. 18 is the same as that in the first exemplary embodiment except that ST4" and ST3" are executed in place of ST2 to ST4 in the first exemplary embodiment previously described with reference to FIG. 9 and therefore ST1 and ST5 to ST8 will not be discussed again in detail.

At ST4" in FIG. 18, for a record sheet S of a fed medium, medium pattern information in the pattern-information-read-area 13*a* is read. Then, the process goes to ST3".

At ST3", the following (1) and (2) are executed and the process goes to ST5:

(1) Image information is expanded and a pattern-information-read-area 13*a* not duplicate with any of the image areas 11*a* to 11*c* is detected and is set as the pattern-information-read-area 13 to be used; and (2) a readable area 12 of an extent of a medium-pattern-information-determination-information-write-area 14 or more is detected and is set as a medium-pattern-information-determination-information-write-area 14.

(Operation of Third Exemplary Embodiment)

In the printer U of the third exemplary embodiment including the configuration described above, the pattern-information-read-area 13 is selected and is set from among the preset pattern-information-read-areas 13*a* where medium pattern information is read in response to the print image. That is, it is made possible to feed a record sheet S and it is made possible to read pattern information of the medium before an image is expanded and a readable area 12 is detected and a medium-pattern-information-read-area 13 is set.

Fourth Exemplary Embodiment

Figures 19A, 19B, 19C:
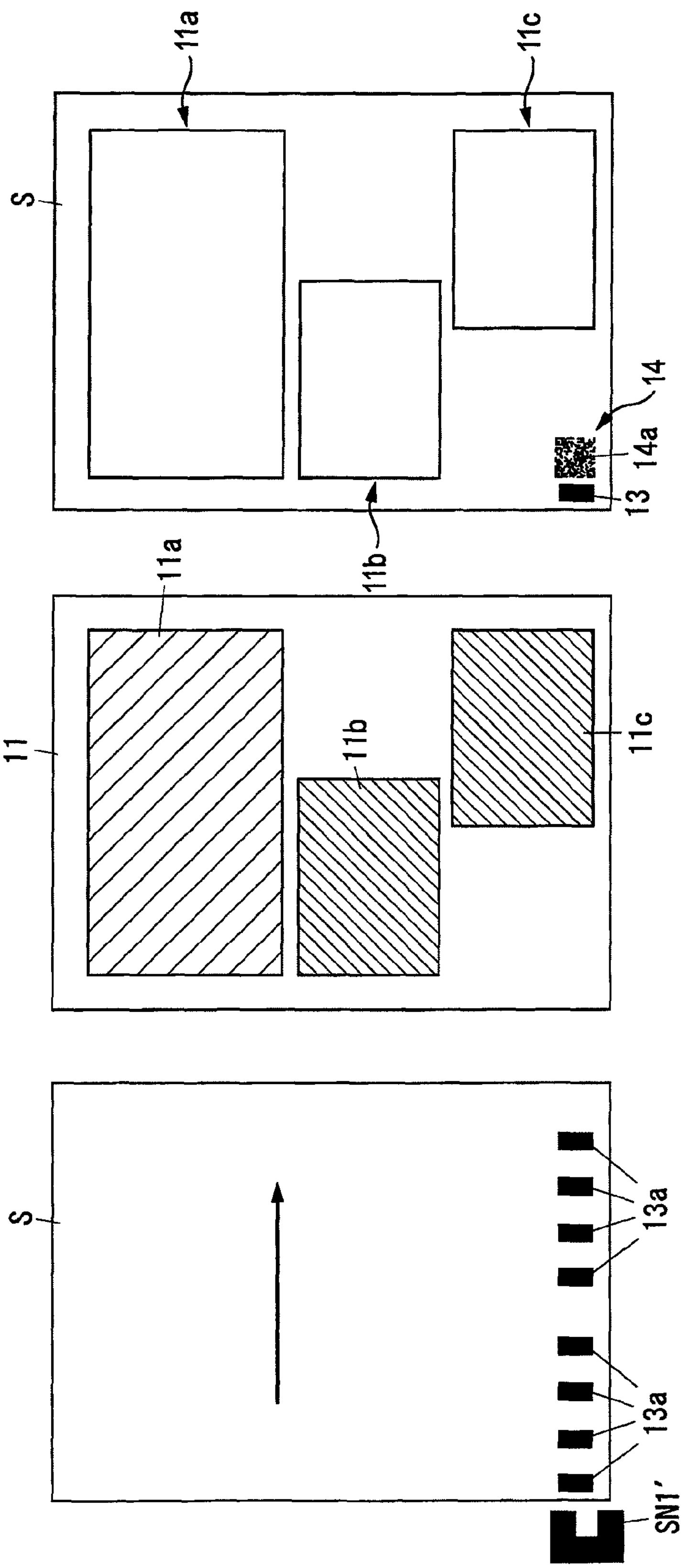
FIGS. 19A to 19C are a schematic representation of an example of a print image of a fourth exemplary embodiment of the invention.

Next, a fourth exemplary embodiment of the invention will be discussed. Components identical with or similar to those of the first or third exemplary embodiment described above are denoted by the same reference numerals in the description of the fourth exemplary embodiment and will not be discussed again in detail. The fourth exemplary embodiment differs from the first or third exemplary embodiment only in the following point:

FIGS. 19A to 19C are a schematic representation of an example of a print image of the fourth exemplary embodiment of the invention; FIG. 19A is a schematic representation of a medium-pattern-information-read-area; FIG. 19B is a schematic representation of a print image; and FIG. 19C is a schematic representation of a print-image-with-medium-pattern-information-determination-information.

In FIGS. 19A to 19C, unlike the medium-pattern-information-reader SN1 in the first to third exemplary embodiments, a medium-pattern-information-reader SN1' of the fourth exemplary embodiment does not read medium pattern information in all area in the medium width direction and is placed in an end part in the medium width direction and can read medium pattern information in the end part in the medium width direction. Like the image formation system S0 of the third exemplary embodiment, an image formation system S0 of the fourth exemplary embodiment reads medium pattern information in a medium-pattern-information-read-area 13*a* with a predetermined spacing set along the medium conveying direction and sets a pattern-information-read-area 13*a* not duplicate with an image area 11*c* as a pattern-information-read-area 13 to be used.

(Operation of Fourth Exemplary Embodiment)

The image formation system S0 of the fourth exemplary embodiment including the configuration described above reads the medium pattern information through the medium-pattern-information-reader SN1' placed in the end part in the medium width direction, selects and sets a pattern-information-read-area 13 not duplicate with any of the image areas 11*a* to 11*c* of a print image 11, and uses the medium pattern information in the selected area 13.

MODIFIED EXAMPLES

While the exemplary embodiments of the invention have been described in detail, it is to be understood that the invention is not limited to the specific exemplary embodiments described above and various changes and modifications can be made without departing from the spirit and the scope of the invention as claimed. Modified examples of the invention are illustrated below:

(H01) In the exemplary embodiments described above, the information communication line network N is illustrated as a local area network (LAN), but the invention is not limited to it and any line network can be adopted in such a manner that the components are connected using a switched line or the Internet or are connected using a leased line.

(H02) In the exemplary embodiments described above, image information of medium pattern information is contained in the medium-pattern-information-determination-information. However, the image information can be stored only in the management apparatus and only medium identification information and position coordinate information of a pattern-information-read-area 13 can be included and at the collating time, the image information read from the position coordinates can be collated with the image information stored in the management apparatus. It is desirable that the medium-pattern-information-determination-information should be encrypted, but the invention is not limited to it. It is also possible to print position coordinate information, etc., in a readable state by the user. Further, QR code (registered trademark) is illustrated as the encryption method, but the invention is not limited to it. Any known encryption method to enable decryption can be adopted.

(H03) In the exemplary embodiments described above, it is desirable that the medium-pattern-information-read-area 13, etc., should be set in response to print setting information, but processing involved in the setting, etc., can be skipped if a post-treatment unit does not exist.

(H04) In the exemplary embodiments described above, the function units perform centralized processing in the control section C of the printer U or performs distributed processing in the printer U and the apparatus main body H1 of the terminal 1, 4, 5, 6, but the invention is not limited to the illustrated mode and three or more apparatus can also perform distributed processing.

(H05) In the exemplary embodiments described above, printing the medium-pattern-information-determination-information in yellow or transparent toner is illustrated, but the invention is not limited to it. The medium-pattern-information-determination-information can also be printed in any single color or multiple colors.

(H06) In the exemplary embodiments described above, a record sheet S is illustrated as a medium and paper fingerprint is illustrated as medium pattern information, but the invention is not limited to it. For example, for any other material than paper like OHP, it is also possible to read pattern information of a medium formed of surface asperities.

(H07) In the exemplary embodiments described above, when a readable area 12 is detected, a blank image area, namely, an area where the image density is 0% is detected, but the invention is not limited to it. It is also possible to detect a low-density area to such an extent that the image density is very low and paper fingerprint can be read after print as a readable area 12. The density of the low-density area can be set as desired; for example, an area where the image density is 1% or less can also be set.

(H08) In the exemplary embodiments described above, the medium pattern information is read and the medium-pattern-information-determination-information 14*a* is set on the surface of the medium S the same as the image areas 11*a* to 11*c*, but the invention is not limited to the mode. Medium pattern information on the back of the medium can be read and medium-pattern-information-determination-information 14*a* can be written.

(H09) In the exemplary embodiments described above, for example, if the number of blank image areas or low-density areas is small, a medium-pattern-information-read-area 13, etc., can be set in a margin area of the medium outside the image formation area where an image is printed or if processing of erasing the frame of an image is performed, a medium-pattern-information-read-area 13, etc., can be set in the frame erasing area where an image is erased. If the number of blank image areas, etc., is small, the medium-pattern-information-read-area 13 can also be made small by increasing the resolution of a medium-pattern-information-reader for reading medium pattern information. Further, if the medium-pattern-information-read-area 13 cannot be provided as a quadrangle, a polygon or a distorted shape capable of providing a necessary area can also be made.

(H10) In the exemplary embodiments described above, the medium-pattern-information-determination-information-write-area 14 and the medium-pattern-information-read-area 13 are set to different positions. However, for example, if a partial blank image area can be provided within the medium-pattern-information-determination-information 14*a*, it is also possible to set the medium-pattern-information-read-area 13 in the blank image area within the medium-pattern-information-determination-information 14.

(H11) In the exemplary embodiments described above, the copier V is illustrated as an example of the pattern-information-collating-apparatus, but the invention is not limited to it. A reader capable of reading an image, namely, any desired reader such as an image scanner can be used. In the image formation system S0, the function of the printer U can be incorporated in the copier V or the function of the pattern-information-collating-apparatus can be added to the printer U or the image formation apparatus and the pattern-information-collating-apparatus can be integrated into one.

(H12) In the exemplary embodiments described above, the programs built in the printer U and the control section of the copier V, the pattern-information-registration-program P1 and the pattern-information-collation-program P2 built in the management apparatus 2, and the like are built in each machine, but the invention is not limited to the mode. The programs can also be provided as they are stored on a compact disk, etc., as an example of a storage medium, or can also be provided through a switched line or Internet line.

(H13) In the exemplary embodiments described above, paper fingerprint as an example of pattern information is read only at one specific point of a medium S, but the invention is not limited to the mode. It is also possible to read paper fingerprint at two or more points. In this case, a determination is made based on medium pattern information at the two or more points, whereby whether or not the medium is the original, namely, is valid can be determined with good accuracy and easily as compared with the case where a determination is made based on medium pattern information at one point As medium pattern information is read at two or more points, even if the original medium is broken or becomes dirty or partial paper fingerprint becomes unreadable, medium pattern information is read in the pattern-information-read-area of any other portion, whereby it is made possible to determine whether or not the medium is the original. Further, if the number of blank image areas is small and the medium-pattern-information-read-area 13 cannot be secured sufficiently, it is also possible to make setting so as to read two or more points.

(H14) In the exemplary embodiments described above, the position of the medium-pattern-information-reader SN1 is not limited to that illustrated in the exemplary embodiments and can be placed at any desired position where an image can be formed before a medium S arrives at the transfer area Q4 after medium pattern information is read. At this time, to perform various types of processing, it is desirable that the medium pattern information should be read as early as possible. Thus, for example, the medium-pattern-information-reader SN1 can be placed on each sheet feed passage SH1 just after sheet feed from each sheet feed vessel TR1, TR2, TR3, at the sheet feed passage SH1 merging position, etc.

What is claimed is:

1. An image formation system comprising:

a processor, wherein the process functions as:

a medium-pattern-information-read-unit that reads pattern information of a surface of a medium;

a pattern-information-image-creation-unit that creates a pattern information image based on the read pattern information; and a print unit that adds the pattern information image to a print image to be printed on the surface of the medium and prints the print image on the medium; and, wherein the pattern information of the surface of the medium includes information indicating a random pattern unique to the medium originating in tangles of fibrous material forming the medium.

2. The image formation system of claim 1, wherein the pattern information image includes position information indicating a position in which the pattern information image is read from the medium.

3. The image formation system of claim 1, further comprising the processor function as:

a pattern-information-read-area-detection-unit that detects a pattern-information-read-area from the print image, the pattern-information-read-area including an area where an image is not printed and an area where an image having so low a density that the pattern information can be read is printed, wherein the medium-pattern-information-read-unit reads pattern information in the pattern-information-read-area detected by the pattern-information-read-area-detection-unit.

4. The image formation system of claim 3, further comprising the processor function as:

a management-information-reception-unit that receives management information containing print image information and pattern-information-read-area-information, the print image information being information of the print image containing the pattern information image, the pattern-information-read-area-information being information concerning the pattern-information-read-area;

a management-information-storage-unit that stores the received management information;

an inquiry-information-reception-unit that receives inquiry information containing the pattern information image printed on a medium to be collated to see whether or not the medium is an original medium; and a collation unit that collates the inquiry information with the management information stored in the management-information-storage-unit to determine whether or not the medium is the original medium.

5. The image formation system of claim 1, wherein the medium-pattern-information-read-unit reads the pattern information in a margin area outside an image formation area where the print image is printed in the medium.

6. The image formation system of claim 1, wherein the medium-pattern-information-read-unit reads the pattern information in an area other than an area where post-treatment is executed based on post-treatment information concerning the post-treatment to be executed.

7. The image formation system of claim 1, wherein the print unit prints the pattern information image in a color that is difficult or impossible for a human being to view.

8. The image formation system of claim 1, wherein the print unit prints the pattern information image at a position different from the read area of the pattern information.

9. An image formation system comprising:

a processor, wherein the processor function as:

a medium-pattern-information-read-unit that reads pattern information of a surface of a medium;

a pattern-information-image-creation-unit that creates a pattern information image based on the read pattern information;

a print unit that adds the pattern information image to a print image to be printed on the surface of the medium and prints the print image on the medium; and, a pattern-information-read-area-detection-unit that detects a pattern-information-read-area from the print image, the pattern-information-read-area including an area where an image is not printed and an area where an image having so low a density that the pattern information can be read is printed, wherein the medium-pattern-information-read-unit reads pattern information in a plurality of areas on the surface of the medium, and the pattern-information-image-creation-unit creates the pattern information image based on the pattern information in an area selected from the plurality of areas, the area ma matching the pattern-information-read-area detected by a pattern-information-read-area-detection-unit.

10. An image formation system comprising:

a processor, wherein the processor function as:

a medium-pattern-information-read-unit that reads pattern information of a surface of a medium;

a pattern-information-image-creation-unit that creates a pattern information image based on the read pattern information; and a print unit that adds the pattern information image to a print image to be printed on the surface of the medium and prints the print image on the medium; and, a medium-pattern-information-reader capable of reading pattern information in a plurality of areas in a main scanning direction of the surface of the medium, wherein the medium-pattern-information-read-unit can read the pattern information in an arbitrary area on a plane along the surface of the medium in the medium moving in a subscanning direction relative to the medium-pattern-information-reader.

11. An image formation system comprising:

a processor, wherein the processor function as:

a medium-pattern-information-read-unit that reads pattern information of a surface of a medium;

a pattern-information-image-creation-unit that creates a pattern information image based on the read pattern information; and a print unit that adds the pattern information image to a print image to be printed on the surface of the medium and prints the print image on the medium; and, a medium-pattern-information-reader placed at a given position in a main scanning direction of the medium, wherein the medium-pattern-information-read-unit can read the pattern information in a plurality of areas along a subscanning direction of the surface of the medium in the medium moving in the subscanning direction relative to the medium-pattern-information-reader.

* * * * *